US011871405B2

(12) United States Patent
Zhang et al.

(10) Patent No.: US 11,871,405 B2
(45) Date of Patent: Jan. 9, 2024

(54) SCHEDULING PARAMETERS FOR UNEQUAL DOWNLINK AND UPLINK TRANSMISSIONS

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 17/443,764

(22) Filed: Jul. 27, 2021

(65) Prior Publication Data

US 2023/0034421 A1 Feb. 2, 2023

(51) Int. Cl.
*H04W 72/1263* (2023.01)
*H04L 5/00* (2006.01)
(Continued)

(52) U.S. Cl.
CPC ....... *H04W 72/1263* (2013.01); *H04L 5/0048* (2013.01); *H04L 5/16* (2013.01); *H04W 52/52* (2013.01)

(58) Field of Classification Search
CPC . H04W 72/1263; H04W 52/52; H04W 72/23; H04W 72/0446; H04W 72/1268;
(Continued)

(56) References Cited

U.S. PATENT DOCUMENTS

2013/0089044 A1* 4/2013 Park .................... H04W 52/146 370/329
2019/0357149 A1* 11/2019 Zhang ................. H04W 52/146
(Continued)

FOREIGN PATENT DOCUMENTS

CN 104904132 A * 9/2015 ........... H04B 7/0413
CN 108476481 A * 8/2018 .............. H04J 11/00
(Continued)

OTHER PUBLICATIONS

International Search Report and Written Opinion—PCT/US2022/073841—ISA/EPO—dated Oct. 13, 2022 (2103207WO).

*Primary Examiner* — Ayaz R Sheikh
*Assistant Examiner* — Louis Samara
(74) *Attorney, Agent, or Firm* — Holland & Hart LLP

(57) ABSTRACT

Methods, systems, and devices for wireless communications are described. A user equipment (UE) may receive one or more messages scheduling resources allocated for one or more uplink transmissions that at least partially overlap in time with scheduled resources allocated for one or more downlink transmissions. In such cases, the UE may use different communication parameters for overlapping and non-overlapping resources. For example, the UE may receive a configuration of a first set of communication parameters that are configured for an overlapping portion of the resources and a second set of communication parameters that are configured for a non-overlapping portion of the resources. The UE may apply the first set of communication parameters and the second set of communication parameters to the uplink and downlink resources for transmitting or receiving the one or more uplink and downlink communications.

30 Claims, 21 Drawing Sheets

(51) Int. Cl.
*H04L 5/16* (2006.01)
*H04W 52/52* (2009.01)

(58) Field of Classification Search
CPC .. H04W 52/146; H04W 48/16; H04L 5/0048;
H04L 5/16; H04L 5/14; H04L 1/1614;
H04L 5/001; H04L 1/0068; H04B 7/0413;
H04B 7/0695
See application file for complete search history.

(56) References Cited

U.S. PATENT DOCUMENTS

| | | | |
|---|---|---|---|
| 2020/0229112 A1* | 7/2020 | John Wilson | H04W 52/143 |
| 2020/0275504 A1* | 8/2020 | Hosseini | H04W 72/1268 |
| 2020/0296677 A1 | 9/2020 | Hosseini et al. | |
| 2022/0030620 A1* | 1/2022 | Cirik | H04B 7/0695 |
| 2022/0209911 A1* | 6/2022 | Zou | H04L 5/0048 |
| 2023/0014238 A1* | 1/2023 | Pocovi | H04L 5/14 |
| 2023/0031276 A1* | 2/2023 | Kwak | H04W 48/16 |

FOREIGN PATENT DOCUMENTS

| | | | | |
|---|---|---|---|---|
| EP | 3018938 A1 * | 5/2016 | | H04L 27/0006 |
| HK | WO-2021146702 A1 * | 7/2021 | | H04L 1/1614 |
| WO | WO-2018229951 A1 * | 12/2018 | | H04L 1/0068 |
| WO | WO-2020253585 A1 * | 12/2020 | | H04B 7/0404 |
| WO | WO-2021146702 A1 * | 7/2021 | | H04L 1/1614 |
| WO | WO-2021206315 A1 * | 10/2021 | | H04L 5/001 |

* cited by examiner

SCHEDULING PARAMETERS FOR UNEQUAL DOWNLINK AND UPLINK TRANSMISSIONS

FIELD OF TECHNOLOGY

The following relates to wireless communications, including scheduling parameters for unequal downlink and uplink transmissions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a communication device (e.g., a UE, a base station) may experience self-interference while performing full-duplex communications with other communication devices. This self-interference may decrease the reliability and efficiency of the full-duplex communications.

SUMMARY

The described techniques relate to improved methods, systems, devices, and apparatuses that support scheduling parameters for unequal downlink and uplink transmissions. Generally, the described techniques provide for efficient communications between devices operating in a full-duplex mode, a half-duplex mode, or both. For example, a user equipment (UE) may transmit uplink communications while simultaneously receiving downlink communications. Similarly, a base station may transmit downlink communications while simultaneously receiving uplink communications. In some cases, however, uplink and downlink transmissions from devices operating in a full-duplex mode may be unequal in duration such that at least some resources allocated to the uplink and downlink transmissions may at least partially overlap in time, causing self-interference.

To reduce the effects of self-interference, a number of different transmission parameters may be applied to both overlapping and non-overlapping portions of the uplink and downlink transmissions. For example, the UE may receive one or more messages scheduling resources for transmitting uplink and receiving downlink communications, where at least some resources for the uplink transmissions may overlap with the resources for the downlink transmissions (e.g., for full-duplex communications). In one example, the uplink transmission(s) may have a greater duration in the time domain than the downlink transmission(s). In other examples, the downlink transmission(s) may have a greater duration in the time domain than the uplink transmission(s). In either case, the UE may receive a configuration including first and second sets of communications parameters that the UE may apply separately to the overlapping and non-overlapping portions of the resources. Here, the first set of communications parameters may be applied to portions of one or more resources that overlap (e.g., for simultaneous uplink and downlink transmissions), whereas the second set of communications parameters may be applied to portions of one or more resources that are non-overlapping (e.g., uplink resources that do not overlap with downlink resources, downlink resources that do not overlap with uplink resources). Such communication parameters may include modulation and coding scheme (MCS) values, transmission power values, transmit precoding matrix index (TPMI) values, first rank indication (RI) values, or any other transmission parameters, and the different parameters applied to overlapping and non-overlapping resources may reduce the effects of self-interference for full-duplex communications.

A method for wireless communications at a UE is described. The method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain, receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and applying the first set of communication parameters and the second set of communication parameters to the uplink resources and the downlink resources for communicating the one or more uplink transmissions and the one or more downlink transmissions with the base station.

An apparatus for wireless communications at a UE is described. The apparatus may include a processor, memory coupled with the processor, and instructions stored in the memory. The instructions may be executable by the processor to cause the apparatus to receive, from a base station, one or more messages scheduling uplink resources allocated for one or more uplink transmissions and downlink resources allocated for one or more downlink transmissions, where a portion of the uplink resources and the downlink resources at least partially overlap in a time domain, receive a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and apply the first set of communication parameters and the second set of communication parameters to the uplink resources and the downlink resources for communicating the one or more uplink transmissions and the one or more downlink transmissions with the base station.

Another apparatus for wireless communications at a UE is described. The apparatus may include means for receiving, from a base station, one or more messages scheduling uplink resources allocated for one or more uplink transmissions and downlink resources allocated for one or more downlink transmissions, where a portion of the uplink resources and the downlink resources at least partially overlap in a time domain, means for receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and means for applying the first set of communication parameters and the second set of communication parameters to the uplink resources and the downlink resources for communicating the one or more uplink transmissions and the one or more downlink transmissions with the base station.

A non-transitory computer-readable medium storing code for wireless communications at a UE is described. The code may include instructions executable by a processor to receive, from a base station, one or more messages scheduling uplink resources allocated for one or more uplink transmissions and downlink resources allocated for one or more downlink transmissions, where a portion of the uplink resources and the downlink resources at least partially overlap in a time domain, receive a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and apply the first set of communication parameters and the second set of communication parameters to the uplink resources and the downlink resources for communicating the one or more uplink transmissions and the one or more downlink transmissions with the base station.

In some examples of the method, apparatuses, and non-transitory computer-readable medium described herein, the first set of communication parameters includes a first transmission power and the second set of communication parameters includes a second transmission power different than the first transmission power and the method, apparatuses, and non-transitory computer-readable medium may include further operations, features, means, or instructions for receiving, in one or more fields of the one or more messages scheduling uplink and downlink resources, an indication of the first transmission power and the second transmission power and adjusting an automatic gain control for the first transmission power and the second transmission power based on the one or more fields.

In some examples of the method, apparatuses, and non-transitory computer-readable medium described herein, the one or more fields of the one or more messages scheduling the uplink resources and the downlink resources indicate a power offset between the overlapping portion of the uplink resources and the downlink resources.

In some examples of the method, apparatuses, and non-transitory computer-readable medium described herein, the first set of communication parameters correspond to a first transmission power and the second set of communication parameters correspond to a second transmission power different than the first transmission power and the method, apparatuses, and non-transitory computer-readable medium may include further operations, features, means, or instructions for identifying, based on the one or more messages, a time period including a gap between the overlapping portion and the non-overlapping portion of the uplink resources or the non-overlapping portion of the downlink resources and adjusting an automatic gain control during the time period based on the first transmission power and the second transmission power.

Some examples of the method, apparatuses, and non-transitory computer-readable medium described herein may further include operations, features, means, or instructions for receiving, in the one or more messages, an indication of whether a phase discontinuity exists between the overlapping portion and the non-overlapping portion of the uplink resources or the non-overlapping portion of the downlink resources and applying one or more phase discontinuity adjustments in accordance with a set of phase discontinuity adjustment rules based on the indication.

Some examples of the method, apparatuses, and non-transitory computer-readable medium described herein may further include operations, features, means, or instructions for receiving, in the one or more messages, an indication of the phase discontinuity between the overlapping portion and the non-overlapping portion of the uplink resources or the non-overlapping portion of the downlink resources and identifying a single-use demodulation reference signal (DMRS for channel estimation and power adjustment based on the set of phase discontinuity adjustment rules and the indication of the phase discontinuity.

Some examples of the method, apparatuses, and non-transitory computer-readable medium described herein may further include operations, features, means, or instructions for receiving, in the one or more messages, an indication of a phase continuity between the overlapping portion and the non-overlapping portion of the uplink resources or the non-overlapping portion of the downlink resources and identifying a DMRS to re-use for channel estimation and power adjustment based on the set of phase discontinuity adjustment rules and the indication of the phase continuity.

Some examples of the method, apparatuses, and non-transitory computer-readable medium described herein may further include operations, features, means, or instructions for receiving, in one or more fields of the one or more messages scheduling the uplink resources and the downlink resources, a power offset indicating a phase discontinuity between the overlapping portion and the non-overlapping portion of the uplink resources or the non-overlapping portion of the downlink resources and applying one or more phase discontinuity adjustment rules based on the power offset.

In some examples of the method, apparatuses, and non-transitory computer-readable medium described herein, the power offset includes a power offset threshold and the method, apparatuses, and non-transitory computer-readable medium may include further operations, features, means, or instructions for comparing a measured power offset between the overlapping portion and the non-overlapping portion of the uplink resources or the non-overlapping portion of the downlink resources to the power offset threshold and applying one or more phase discontinuity adjustment rules based on the comparison.

In some examples of the method, apparatuses, and non-transitory computer-readable medium described herein, the first set of communication parameters includes a first MCS value and the second set of communication parameters includes a second MCS value different than the first MCS value and the method, apparatuses, and non-transitory computer-readable medium may include further operations, features, means, or instructions for receiving a first reference signal on the overlapping portion of the downlink resources and a second reference signal on the non-overlapping portion of the downlink resources and determining a value for the first MCS value based on the first reference signal and a value for the second MCS value based on the second reference signal.

In some examples of the method, apparatuses, and non-transitory computer-readable medium described herein, the first reference signal and the second reference signal include a channel state information reference signal (CSI-RS), a DMRS, or a combination thereof.

Some examples of the method, apparatuses, and non-transitory computer-readable medium described herein may further include operations, features, means, or instructions for receiving, from the base station, a configuration indicating at least a portion of the uplink resources allocated for one or more sounding reference signal (SRS) transmissions and transmitting, to the base station, the one or more SRS transmissions on the uplink resources in accordance with the configuration.

In some examples of the method, apparatuses, and non-transitory computer-readable medium described herein, the uplink resources include the overlapping portion of the uplink resources and the non-overlapping portion of the uplink resources.

In some examples of the method, apparatuses, and non-transitory computer-readable medium described herein, the uplink resources include the overlapping portion of the uplink resources or the non-overlapping portion of the uplink resources and the method, apparatuses, and non-transitory computer-readable medium may include further operations, features, means, or instructions for transmitting, to the base station, an indication of one or more transmission parameters for the other of the overlapping portion of the uplink resources or the non-overlapping portion of the uplink resources based on the one or more SRS transmissions on the uplink resources, where the one or more transmission parameters for the other of the overlapping portion of the uplink resources or the non-overlapping portion of the uplink resources include a transmission power backoff offset value.

Some examples of the method, apparatuses, and non-transitory computer-readable medium described herein may further include operations, features, means, or instructions for identifying a phase discontinuity between the overlapping portion and the non-overlapping portion of the uplink resources or the non-overlapping portion of the downlink resources and transmitting an indication of the phase discontinuity to the base station.

In some examples of the method, apparatuses, and non-transitory computer-readable medium described herein, transmitting the indication of the phase discontinuity may include operations, features, means, or instructions for transmitting the indication of the phase discontinuity in a capability message, an uplink control message, or a combination thereof.

In some examples of the method, apparatuses, and non-transitory computer-readable medium described herein, the first set of communication parameters correspond to first MCS values, first transmission power values, first TPMI values, first RI values, or any combination thereof, and the second set of communication parameters correspond to second MCS values, second transmission power values, second TPMI values, second RI values, or any combination thereof.

Some examples of the method, apparatuses, and non-transitory computer-readable medium described herein may further include operations, features, means, or instructions for identifying the portion of the uplink resources and the downlink resources that overlap based on a difference in a duration of the one or more uplink transmissions and a respective duration of the one or more downlink transmissions.

In some examples of the method, apparatuses, and non-transitory computer-readable medium described herein, an uplink transmission of the one or more uplink transmissions may have a longer duration relative to a duration of a downlink transmission of the one or more downlink transmissions.

In some examples of the method, apparatuses, and non-transitory computer-readable medium described herein, an uplink transmission of the one or more uplink transmissions may have a shorter duration relative to a duration of a downlink transmission of the one or more downlink transmissions.

In some examples of the method, apparatuses, and non-transitory computer-readable medium described herein, the one or more uplink transmissions and the one or more downlink transmissions include full-duplex transmissions, half duplex transmissions, or a combination thereof.

A method for wireless communications at a base station is described. The method may include transmitting, to a UE, one or more messages scheduling uplink resources allocated for one or more uplink transmissions and downlink resources allocated for one or more downlink transmissions, where a portion of the uplink resources and the downlink resources at least partially overlap in a time domain, transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and receiving, from the UE, the one or more uplink transmissions in accordance with the first set of communication parameters and the second set of communication parameters.

An apparatus for wireless communications at a base station is described. The apparatus may include a processor, memory coupled with the processor, and instructions stored in the memory. The instructions may be executable by the processor to cause the apparatus to transmit, to a UE, one or more messages scheduling uplink resources allocated for one or more uplink transmissions and downlink resources allocated for one or more downlink transmissions, where a portion of the uplink resources and the downlink resources at least partially overlap in a time domain, transmit a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and receive, from the UE, the one or more uplink transmissions in accordance with the first set of communication parameters and the second set of communication parameters.

Another apparatus for wireless communications at a base station is described. The apparatus may include means for transmitting, to a UE, one or more messages scheduling uplink resources allocated for one or more uplink transmissions and downlink resources allocated for one or more downlink transmissions, where a portion of the uplink resources and the downlink resources at least partially overlap in a time domain, means for transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and means for receiving, from the UE, the one or more uplink transmissions in accordance with the first set of communication parameters and the second set of communication parameters.

A non-transitory computer-readable medium storing code for wireless communications at a base station is described. The code may include instructions executable by a processor to transmit, to a UE, one or more messages scheduling uplink resources allocated for one or more uplink transmissions and downlink resources allocated for one or more downlink transmissions, where a portion of the uplink resources and the downlink resources at least partially overlap in a time domain, transmit a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof, and receive, from the UE, the one or more uplink transmissions in accordance with the first set of communication parameters and the second set of communication parameters.

In some examples of the method, apparatuses, and non-transitory computer-readable medium described herein, the first set of communication parameters includes a first transmission power and the second set of communication parameters includes a second transmission power different than the first transmission power and the method, apparatuses, and non-transitory computer-readable medium may include further operations, features, means, or instructions for transmitting, in one or more fields of the one or more messages scheduling uplink and downlink resources, an indication of the first transmission power and the second transmission power and applying the first transmission power to the overlapping portion of the uplink resources and the second transmission power to the non-overlapping portion of the uplink resources, a non-overlapping portion of the downlink resources, or a combination thereof.

In some examples of the method, apparatuses, and non-transitory computer-readable medium described herein, the one or more fields of the one or more messages scheduling the uplink resources and the downlink resources indicate a power offset between the overlapping portion of the uplink resources and the downlink resources.

In some examples of the method, apparatuses, and non-transitory computer-readable medium described herein, the first set of communication parameters correspond to a first transmission power and the second set of communication parameters correspond to a second transmission power different than the first transmission power and the method, apparatuses, and non-transitory computer-readable medium may include further operations, features, means, or instructions for allocating a time gap between the overlapping portion and the non-overlapping portion of the uplink resources or the non-overlapping portion of the downlink resources for the UE to use to perform automatic gain control based on the first transmission power and the second transmission power.

Some examples of the method, apparatuses, and non-transitory computer-readable medium described herein may further include operations, features, means, or instructions for transmitting, in the one or more messages, an indication of whether a phase discontinuity exists between the overlapping portion and the non-overlapping portion of the uplink resources or the non-overlapping portion of the downlink resources and receiving the one or more uplink transmissions in accordance with a set of phase discontinuity adjustment rules applied by the UE based on the indication.

Some examples of the method, apparatuses, and non-transitory computer-readable medium described herein may further include operations, features, means, or instructions for transmitting, in the one or more messages, an indication of the phase discontinuity between the overlapping portion and the non-overlapping portion of the uplink resources or the non-overlapping portion of the downlink resources, transmitting a single-use DMRS for channel estimation and power adjustment based on the set of phase discontinuity adjustment rules and the indication of the phase discontinuity, and transmitting a DMRS to re-use for channel estimation and power adjustment based on the set of phase discontinuity adjustment rules and the indication of the phase discontinuity.

Some examples of the method, apparatuses, and non-transitory computer-readable medium described herein may further include operations, features, means, or instructions for transmitting, in one or more fields of the one or more messages scheduling the uplink resources and the downlink resources, an indication of one or more phase discontinuity adjustment rules associated with a power offset for a phase discontinuity between the overlapping portion and the non-overlapping portion of the uplink resources or the non-overlapping portion of the downlink resources.

In some examples of the method, apparatuses, and non-transitory computer-readable medium described herein, the power offset includes a power offset threshold and the method, apparatuses, and non-transitory computer-readable medium may include further operations, features, means, or instructions for receiving the one or more uplink transmissions in accordance with the one or more phase discontinuity adjustment rules and the power offset threshold for the overlapping portion and the non-overlapping portion of the uplink resources or the non-overlapping portion of the downlink resources.

In some examples of the method, apparatuses, and non-transitory computer-readable medium described herein, the first set of communication parameters includes a first MCS value and the second set of communication parameters includes a second MCS value different than the first MCS value and the method, apparatuses, and non-transitory computer-readable medium may include further operations, features, means, or instructions for transmitting a first reference signal on the overlapping portion of the downlink resources and a second reference signal on the non-overlapping portion of the downlink resources.

In some examples of the method, apparatuses, and non-transitory computer-readable medium described herein, the first reference signal and the second reference signal include a CSI-RS, a DMRS, or a combination thereof.

Some examples of the method, apparatuses, and non-transitory computer-readable medium described herein may further include operations, features, means, or instructions for transmitting, to the UE, a configuration indicating at least a portion of the uplink resources allocated for one or more SRS transmissions and receiving, from the UE, the one or more SRS transmissions on the uplink resources in accordance with the configuration.

In some examples of the method, apparatuses, and non-transitory computer-readable medium described herein, the uplink resources include the overlapping portion of the uplink resources and the non-overlapping portion of the uplink resources.

Some examples of the method, apparatuses, and non-transitory computer-readable medium described herein may further include operations, features, means, or instructions for receiving a first SRS transmission on the overlapping portion of the uplink resources and the downlink resources, and a second SRS transmission on the non-overlapping portion of the uplink resources and the downlink resources and estimating a first MCS value and a second MCS value based on the first SRS transmission and the second SRS transmission.

Some examples of the method, apparatuses, and non-transitory computer-readable medium described herein may further include operations, features, means, or instructions for receiving, from the UE, an indication of a phase discontinuity between the overlapping portion and the non-overlapping portion of the uplink resources or the non-overlapping portion of the downlink resources.

Some examples of the method, apparatuses, and non-transitory computer-readable medium described herein may further include operations, features, means, or instructions for receiving the indication of the phase discontinuity in a capability message, an uplink control message, or a combination thereof.

In some examples of the method, apparatuses, and non-transitory computer-readable medium described herein, the first set of communication parameters correspond to first MCS values, first transmission power values, first TPMI values, first RI values, or any combination thereof, and the second set of communication parameters correspond to second MCS values, second transmission power values, second TPMI values, second RI values, or any combination thereof.

Some examples of the method, apparatuses, and non-transitory computer-readable medium described herein may further include operations, features, means, or instructions for identifying the portion of the uplink resources and the downlink resources that overlap based on a difference in a duration of the one or more uplink transmissions and a respective duration of the one or more downlink transmissions.

In some examples of the method, apparatuses, and non-transitory computer-readable medium described herein, an uplink transmission of the one or more uplink transmissions may have a longer duration relative to a duration of a downlink transmission of the one or more downlink transmissions.

In some examples of the method, apparatuses, and non-transitory computer-readable medium described herein, an uplink transmission of the one or more uplink transmissions may have a shorter duration relative to a duration of a downlink transmission of the one or more downlink transmissions.

DETAILED DESCRIPTION

Figure 1:
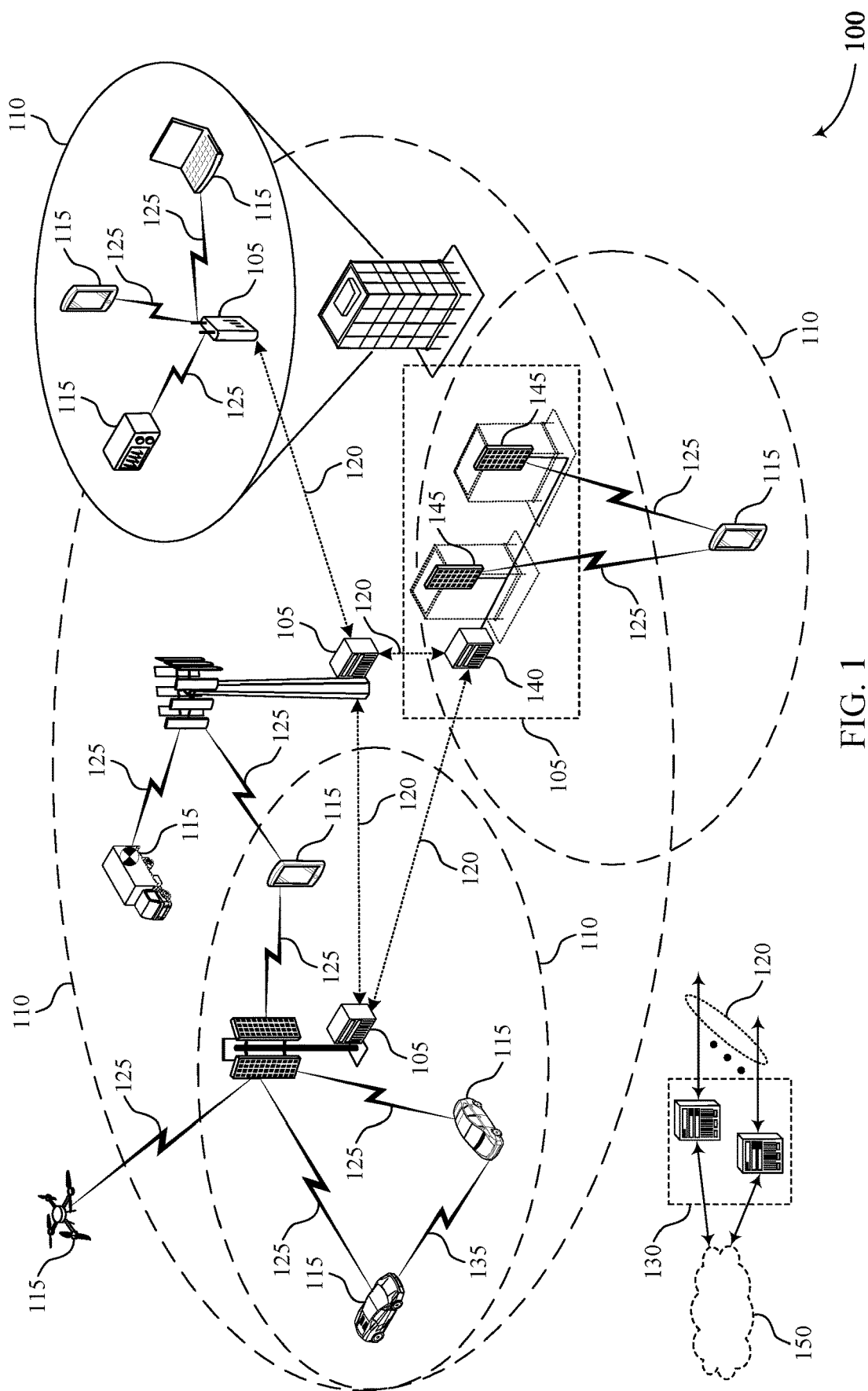
FIG. 1 illustrates an example of a wireless communications system that supports scheduling parameters for unequal downlink and uplink transmissions in accordance with aspects of the present disclosure.

In some wireless communications systems, wireless devices may support communications using a full-duplex mode, a half-duplex mode, or both. For example, a user equipment (UE) may transmit uplink communications from one antenna panel and may simultaneously receive downlink communications using a different antenna panel. Similarly, a base station may transmit downlink communications from one antenna panel and may simultaneously receive uplink communications using a different antenna panel. In some cases, however, uplink and downlink transmissions from devices operating in a full-duplex mode may be unequal in duration such that resources allocated to the transmissions at least partially overlap in time. The overlapping resources (and communications) may cause self-interference at a device (e.g., the UE, the base station), among other communication inefficiencies.

To reduce the effects of self-interference and to increase the efficiency of full-duplex communications, a number of different transmission parameters may be applied to both overlapping and non-overlapping portions of the overlapping uplink and downlink transmissions. For example, a base station or a UE may apply different transmission powers, modulation and coding scheme (MCS) values, precoder indices, among other parameters, to the overlapping and non-overlapping portions of the uplink and downlink transmissions. Put another way, the portions of the resources that overlap may be configured with a first set of transmission parameters, and the portions of the resources that are non-overlapping (e.g., do not overlap with other scheduled resources) may be configured with a second, different set of transmission parameters.

In some cases, a downlink transmission may occupy a greater number of symbols relative to an uplink transmission. In such cases, the base station may configure the different parameters (e.g., MCS, precoder indices, transmission power) as different sets of values: one for overlapping symbols and one for non-overlapping symbols. For example, the base station may apply different transmission powers or different power offsets, or both, to overlapping and non-overlapping symbols. Additionally or alternatively, the base station may identify a phase discontinuity for the overlapping and non-overlapping resources, which may be signaled (e.g., implicitly, explicitly) to the UE. In some other examples, the base station may configure different reference signals for the UE to use at the overlapping and non-overlapping symbols, and the base station may estimate various MCS values based on the reference signal measurements provided by the UE.

In some other cases, an uplink transmission may occupy a greater number of symbols relative to a downlink transmission. In such cases, the base station may configure different sets of parameters and respective parameters in each set (e.g., MCS, transmission power, transmit precoding matrix index (TPMI), rank indicator (RI), among others) which may be configured with different values for overlapping symbols and non-overlapping symbols for the uplink transmissions. The base station may configure sounding reference signal (SRS) transmissions on either overlapping symbols or non-overlapping symbols, and the base station may estimate parameters (e.g., an MCS) based on the SRS transmissions. In some examples, the UE may adjust transmission power or apply a power backoff based on an identified phase discontinuity between overlapping and non-overlapping symbols.

Aspects of the disclosure are initially described in the context of wireless communications systems. Aspects of the disclosure are further illustrated by and described with reference to apparatus diagrams, uplink and downlink signaling configurations, system diagrams, a process flow, and flowcharts that relate to scheduling parameters for unequal downlink and uplink transmissions.

FIG. 1 illustrates an example of a wireless communications system 100 that supports scheduling parameters for unequal downlink and uplink transmissions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof. Wireless communications system 100 may support respective configurations for overlapping resources (e.g., scheduled for full-duplex communications) and non-overlapping resources (e.g., scheduled for full-duplex and half-duplex communications).

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may support communications between devices operating in a full-duplex mode, a half-duplex mode, or both. For example, a UE 115 may transmit uplink communications while simultaneously receiving downlink communications. Similarly, a base station 105 may transmit downlink communications while simultaneously receiving uplink communications. In some cases, however, uplink and downlink transmissions from devices operating in a full-duplex mode may be unequal in duration such that resources allocated to the transmissions at least partially overlap in time, causing self-interference.

To reduce the effects of self-interference, a number of different transmission parameters may be applied for both overlapping and non-overlapping portions of the uplink and downlink transmissions. In some cases, for example, a downlink transmission may occupy a greater number of symbols relative to an uplink transmission. In such cases, the base station 105 may configure different transmissions parameters (e.g., MCS, precoder indices, transmission power) for overlapping symbols and for non-overlapping symbols. For example, the base station 105 may apply different transmission powers or different power offsets to overlapping and non-overlapping symbols. Additionally or alternatively, the base station 105 may identify a phase discontinuity for the overlapping and non-overlapping resources, which may be signaled (implicitly or explicitly) to the UE 115. In some other examples, the base station 105 may estimate various MCS based on reference signal measurements provided by the UE 115.

In some other cases, an uplink transmission may occupy a greater number of symbols relative to a downlink transmission. In such cases, the base station 105 may configure two different sets of parameters and parameters in the set (e.g., MCS, transmission power, TPMI, RI) which may be configured with two different values for overlapping symbols and non-overlapping symbols for the uplink transmissions. The base station 105 may configure SRS transmissions on either overlapping symbols or non-overlapping symbols, and may estimate MCS based on the SRS transmissions. It is noted that the various examples of parameters configured for overlapping and non-overlapping resources may include other parameters not explicitly described herein. For instance, the overlapping and non-overlapping resources may be configured with one or more additional or alternatively parameters that are different than, for example, an MCS, a transmission power, TPMI, RI, or the like. As such, the examples described herein should not be considered limiting to the scope covered by the claims or the disclosure.

Figure 2:
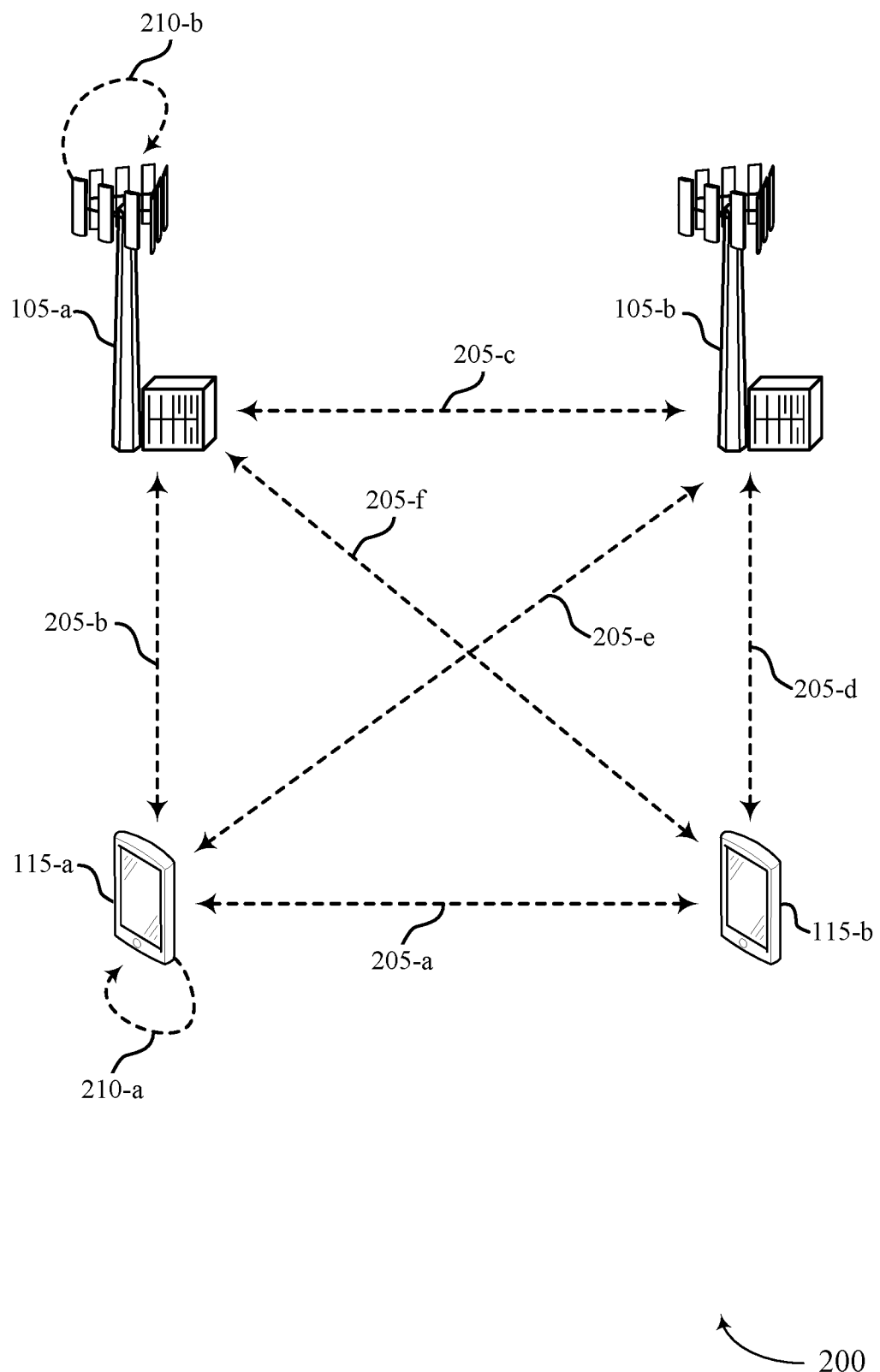
FIG. 2 illustrates an example of a wireless communications system that supports scheduling parameters for unequal downlink and uplink transmissions in accordance with aspects of the present disclosure.

FIG. 2 illustrates an example of a wireless communications system 200 that supports scheduling parameters for unequal downlink and uplink transmissions in accordance with aspects of the present disclosure. In some examples, the wireless communications system 200 may implement aspects of the wireless communications system 100. For example, the wireless communications system 200 includes a UE 115-a, a UE 115-b, a base station 105-a, and a base station 105-b, which may be examples of corresponding devices described with reference to FIG. 1. The wireless communications system 200 may support communications between the base stations 105 and the UEs 115 over communication links 205, which may be examples of a communication link 125 described herein with reference to FIG. 1. The communication links 205 may include uplinks (e.g., uplink communication links), downlinks (e.g., downlink communication links), sidelinks (e.g., sidelink communication links), or a combination thereof.

The wireless communications system 200 may support full-duplex communications between the UEs 115 and the base stations 105. For example, a full-duplex capability may be present at the UEs 115, the base stations 105, or any combination thereof. For example, a UE 115 may transmit uplink communications from one antenna panel and may receive downlink communications using a different antenna panel, thus enabling simultaneous uplink and downlink transmissions to be supported by the UE 115. Similarly, a base station 105 may receive uplink communications from one antenna panel and may transmit downlink communications using a different antenna panel.

In some examples, one or more of the UEs 115 and base stations 105 may experience self-interference while performing full-duplex communications (e.g., between downlink and uplink communications), clutter echo, or other interference. In addition, some uplink and downlink full-duplex transmissions may have unequal durations and may overlap in a time domain. In accordance with techniques described herein, different transmission parameters such as MCS, transmission power, and other parameters may be adjusted differently for overlapping and non-overlapping resources to mitigate self-interference associated with performing full-duplex communications.

The wireless communications system 200 may include one or more wireless devices that support full-duplex communications and one or more wireless devices that support half-duplex communications. Half-duplex wireless devices may be capable of transmitting or receiving messages (but not both) at a specific time, whereas full-duplex wireless devices may be capable of simultaneously transmitting and receiving messages at a specific time. In some cases, the base stations 105 may be half-duplex wireless devices that are unable to perform full-duplex communications. For example, if the base stations 105 are multi-transmission and reception points (multi-TRPs), the base stations 105 may be configured to perform transmission or reception operations (but not both).

In some cases, the UEs 115 may be half-duplex wireless devices and the base stations 105 may be full-duplex wireless devices. In such cases, the UEs 115, the base stations 105, or both may experience interference while communicating with each other. For example, if the base station 105-b transmits a downlink message to the UE 115-a while the base station 105-a is attempting to receive an uplink message from the UE 115-b, the downlink message from the base station 105-b may reduce the likelihood of the base station 105-a successfully decoding the uplink message from the UE 115-b. That is, the base station 105-a may experience interference from the base station 105-b on the communication link 205-c. Similarly, if the UE 115-b transmits an uplink message to the base station 105-a while the UE 115-a is attempting to receive a downlink message from the base station 105-a, the uplink message from the UE 115-b may reduce the likelihood of the UE 115-a successfully decoding the downlink message from the base station 105-a. In other words, the UE 115-a may experience interference from the UE 115-b on the communication link 205-a. Such interference may reduce the reliability of communications between the base stations 105 and the UEs 115.

Additionally or alternatively, the full-duplex wireless devices (e.g., the base stations 105 and UEs 115) may experience self-interference 210-a and 210-b while performing full-duplex communications. For example, if the base station 105-a transmits a downlink message to the UE 115-a while simultaneously receiving an uplink message from the UE 115-a, the downlink message may interfere with the uplink message at the base station 105-a. As a result, the base station 105-a may be unable to successfully decode the uplink message from the UE 115-b. Similarly, if the UE 115-a transmits an uplink message to the base station 105-a while simultaneously receiving a downlink message from the base station 105-b, the uplink message may interfere with the downlink message at the UE 115-a. This self-interference may reduce the reliability of full-duplex communications.

In some cases, a wireless device may perform full-duplex communications with multiple different wireless devices. For example, the UE 115-b may receive a downlink message from the base station 105-b on a communication link 205-d while simultaneously transmitting a sidelink message to the UE 115-b on a communication link 205-a. Likewise, the base station 105-a may transmit a message to the base station 105-b on a communication link 205-c while receiving an uplink message from the UE 115-b on a communication link 205-f.

To mitigate self-interference, a wireless device may use two separate antenna panels to perform different operations at the same time. For example, the base station 105-a may use a first antenna panel for downlink transmission and a second antenna panel for uplink reception. Using separate panels may reduce the likelihood of signals generated at the first antenna panel (e.g., downlink messages) interfering with signals arriving at the second antenna panel (e.g., uplink messages). In some cases, to further reduce self-interference, a wireless device may perform a first operation (e.g., downlink transmission) at both edges of a frequency band and may perform a second operation (e.g., uplink reception) in the middle of the frequency band. That is, the wireless device may transmit and receive at the same time but on different frequency resources. In other words, downlink resources and uplink resources used by the wireless device may be separated in the frequency-domain.

In some cases, however, such techniques for self-interference mitigation may be associated with prohibitive power consumption, excessive processing overhead, or both. In accordance with aspects of the present disclosure, wireless communications system 200 may support a number of techniques for applying various different scheduling parameters for uplink and downlink transmissions that are unequal in duration, resulting in some resources that at least partially overlap during full-duplex communications.

In a first case, downlink transmissions may be longer (e.g., may occupy a greater number of symbols (e.g., OFDM symbols)) than uplink transmissions. In such cases, a base station 105 may configure communication parameters (e.g., MCS, precoder index, rank indicator, transmission powers, among others) differently for overlapping symbols and non-overlapping symbols. For example, the base station 105— may apply different transmission powers or power offsets for overlapping symbols relative to non-overlapping symbols. Additionally or alternatively, a base station 105 may identify a phase discontinuity for the overlapping and non-overlapping resources, which may be signaled (implicitly or explicitly) to a UE 115. In some other examples, a base station 105 may configure different reference signals for a UE 115 to use at the overlapping/non-overlapping symbols, and the base station may estimate various MCS values based on the reference signal measurements provided by the UE 115.

In a second case, uplink transmissions may be longer (e.g., may occupy a greater number of symbols) than downlink transmissions. In such cases, a base station 105 may configure two different sets of parameters and parameters in the set (e.g., MCS, transmit power, TPMI, RI) which may be configured with two different values for overlapping symbols and non-overlapping symbols for the uplink transmissions. For example, a base station 105 may configure SRS transmissions on either overlapping symbols or non-overlapping symbols, where the base station 105 may estimate parameters (e.g., MCS) for the overlapping and non-overlapping symbols based on the SRS transmissions. In some other cases, a UE 115 may transmit a power backoff offset value or an indication of phase discontinuity to a base station 105 such that the base station may adjust communication parameters for the overlapping and non-overlapping symbols.

Applying different values for various transmission parameters associated with overlapping resources for uplink and downlink transmissions in a full-duplex deployment may reduce latency, increase spectrum efficiency and resource utilization, and reduce the effects of phase discontinuity for overlapping and non-overlapping communications between UEs 115 and base stations 105, among other advantages.

Figure 3:
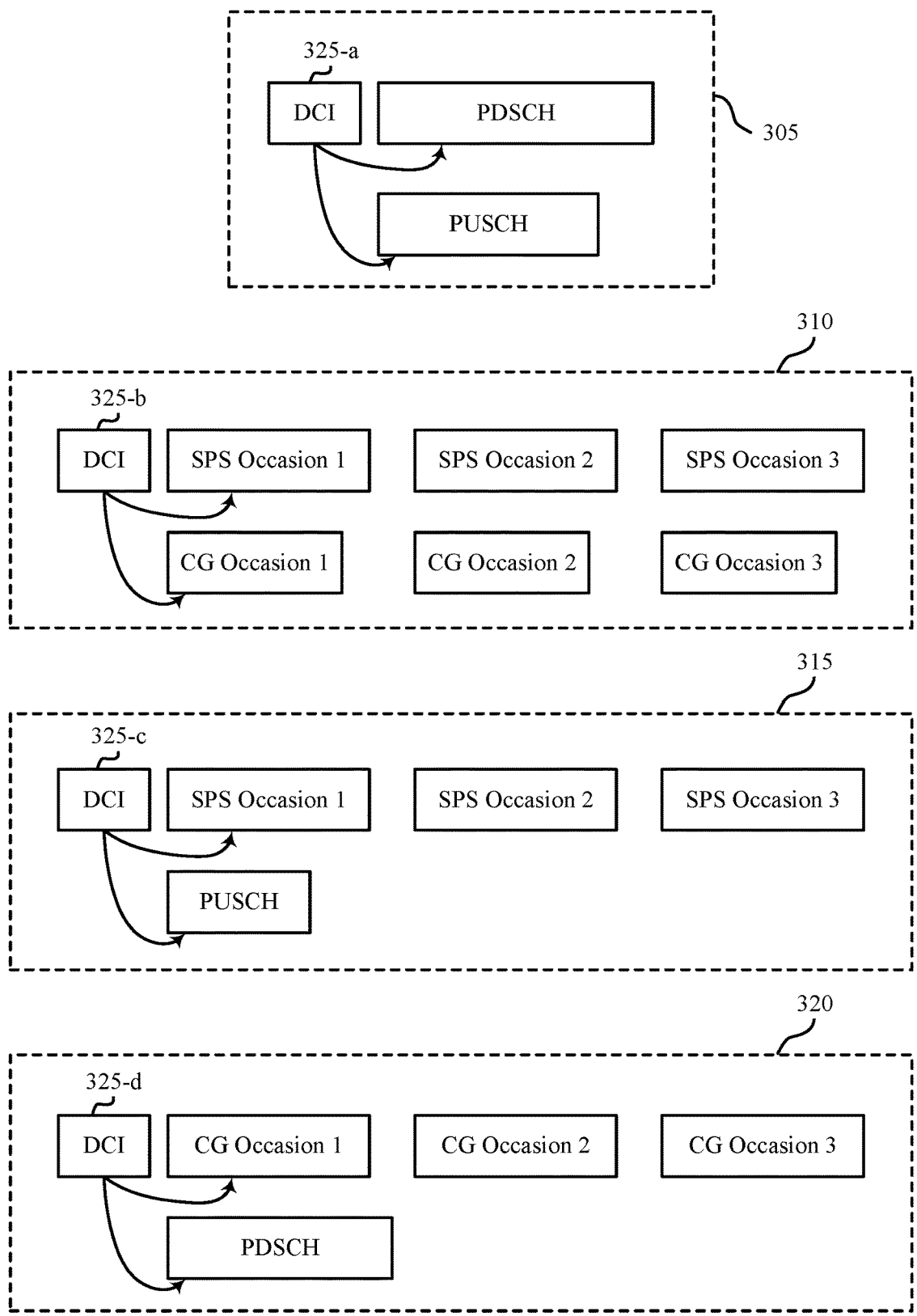
FIGS. 3 and 4 illustrate example downlink and uplink signaling configurations that support scheduling parameters for unequal downlink and uplink transmissions in accordance with aspects of the present disclosure.

FIG. 3 illustrates example downlink and uplink signaling configurations 300 that support scheduling parameters for unequal downlink and uplink transmissions in accordance with aspects of the present disclosure. For example, the signaling configurations 300 may implemented between a base station and a UE that support both half-duplex and full-duplex communications, and which may be examples of a base station 105 and a UE 115 described with reference to FIGS. 1 and 2. In addition, the described techniques applying to downlink and uplink signaling configurations 300 may be similarly performed on other example uplink and downlink configurations.

Some wireless communications systems may support co-existing half-duplex transmissions and full-duplex transmissions. For example, in some cases, half-duplex downlink and uplink transmissions may be time division multiplexed, while full-duplex downlink and uplink transmissions scheduled at the same time resources may be spatial division multiplexed or frequency division multiplexed (SDM/FDM).

In some other cases, however, full-duplex downlink and uplink transmissions may have unequal durations. For example, a downlink transmission may occupy a greater number of symbols than an uplink transmission (e.g., downlink occupies 6 symbols, uplink occupies 3 symbols). In a first example overlap configuration 305, downlink control information (DCI) 325-a schedules a physical downlink shared channel (PDSCH) transmission that occupies a greater number of downlink symbols than a scheduled PUSCH, and the resources allocated for the physical uplink shared channel (PUSCH) overlaps with resources allocated for the PDSCH. It is noted that, while one DCI 325 is shown as scheduling the PDSCH and PUSCH, multiple (e.g., two) different DCIs 325 may respectively schedule PDSCH and PUSCH in this and other examples provided herein. In a second example overlap configuration 310, DCI 325-b activates downlink semi-persistent scheduling (SPS) and an uplink configured grant for downlink and uplink transmissions. In the second example overlap configuration 310, the downlink SPS occasions 1, 2, and 3 may occupy a greater number of symbols than each of the corresponding uplink configured grant occasions 1, 2, and 3. In a third example overlap configuration 315, DCI 325-c may activate downlink SPS and may schedule a PUSCH transmission on uplink resources, and at least the downlink SPS occasion 1 may occupy a greater number of symbols than the PUSCH. In a fourth example overlap configuration 320, DCI 325-d may activate an uplink configured grant and may allocate a number of downlink resources for receiving a PDSCH transmission that is greater in length than the activated uplink configured grant resources.

Based on the unequal durations for the downlink and uplink transmissions in example overlap configurations 305, 310, 315, and 320, there may be overlapping symbols or resources and non-overlapping symbols or resources between the uplink and downlink resources scheduled by one or more DCI 325. Such overlap between symbols or resources may increase self-interference, and different transmission parameters may be used for overlapping and non-overlapping symbols to mitigate the self-interference. For example, based on information contained in the DCI 325 (e.g., within one or more fields of the DCI 325) or other scheduling message (e.g., RRC signaling), the receiving UE may determine different values of MCS, transmission power, power offset, or other parameters, for overlapping and non-overlapping symbols and resources for downlink transmissions.

In some examples, the receiving UE may apply different transmission powers for overlapping symbols and non-overlapping symbols based on information received in the DCI or other scheduling information. For example, the DCI 325 may configure a relatively lower transmission power (e.g., corresponding to a relatively higher power backoff) for the overlapping symbols to mitigate self-interference, and the non-overlapping symbols may be configured with a relatively higher transmission power (e.g., corresponding to a relatively lower power backoff). In some cases, a field may be included in the DCI 325 (or one or more fields may be re-used in the DCI 325) which indicates two different transmission power values for the overlapping symbols and the non-overlapping symbols for downlink transmissions. In such cases, the receiving UE may adjust its automatic gain control to account for transmission power change between the overlapping and non-overlapping symbols. In some other cases (e.g., for a relatively small power offset between uplink and downlink transmissions), the receiving UE may not apply automatic gain control adjustments.

In some other examples, a field may be added to the DCI 325 (or one or more fields may be re-used in the DCI 325) to configure a difference or delta power offset (e.g., a power offset threshold) between the overlapping symbols and the non-overlapping symbols for downlink transmissions. In such examples, the receiving UE may adjust its automatic gain control to account for the transmission power change between the overlapping and non-overlapping symbols. In some other cases (e.g., for relatively small power offset between uplink and downlink transmissions), the receiving UE may not apply automatic gain control adjustments.

In some other examples, the DCI 325 may indicate a number of gap symbols between the overlapping symbols and the non-overlapping symbols which the receiving UE may use for performing self-testing and other measurements to adjust its automatic gain control for receiving overlapping downlink communications.

In some other cases, the base station may explicitly indicate a phase discontinuity associated with different transmission powers for the overlapping and non-overlapping symbols. For example, the base station may indicate (e.g., in the DCI 325 or other signaling) whether there is a phase discontinuity between symbols. In cases where a phase discontinuity is identified, UE may not combine, average, or re-use a demodulation reference signal (DMRS). In cases where the base station indicates phase continuity, however, the UE may reuse DMRS for channel estimation with power and amplitude adjustments.

In some other cases, the base station may implicitly indicate whether there is a phase discontinuity associated with different transmission powers for the overlapping and non-overlapping symbols. For example, implicit indication rules may be predefined to be related to the power offset values between the overlapping and non-overlapping symbols. In another example, implicit indication rules may be predefined such that, if there is a power difference or a power offset between the overlapping and non-overlapping symbols, the UE may assume a phase discontinuity between the overlapping and non-overlapping symbols. A first rule may be that, in cases where the base station indicates a power offset field, the UE may assume a phase discontinuity between overlapping and non-overlapping symbols. In a second example rule, if the indicated power offset is greater than a threshold offset (e.g., power offset>X dB), the UE may assume a phase discontinuity between overlapping and non-overlapping symbols. In cases where the indicated power offset is less than the threshold offset, the UE may assume no phase discontinuity.

To effectively estimate different parameters (e.g., MCS values, transmission powers, etc.) for the overlapping and non-overlapping symbols for the downlink transmissions, the base station may in some cases schedule or configure two reference signal transmissions (e.g., CSI-RS or DMRS) on both overlapping resources and non-overlapping resources. Based on CSI-RS transmissions (and respective feedback transmissions), the base station may estimate a first MCS and a second MCS for the overlapping and non-overlapping resources. Additionally or alternatively, the base station may configure two DMRS transmissions (e.g., in cases of phase discontinuity).

Figure 4:
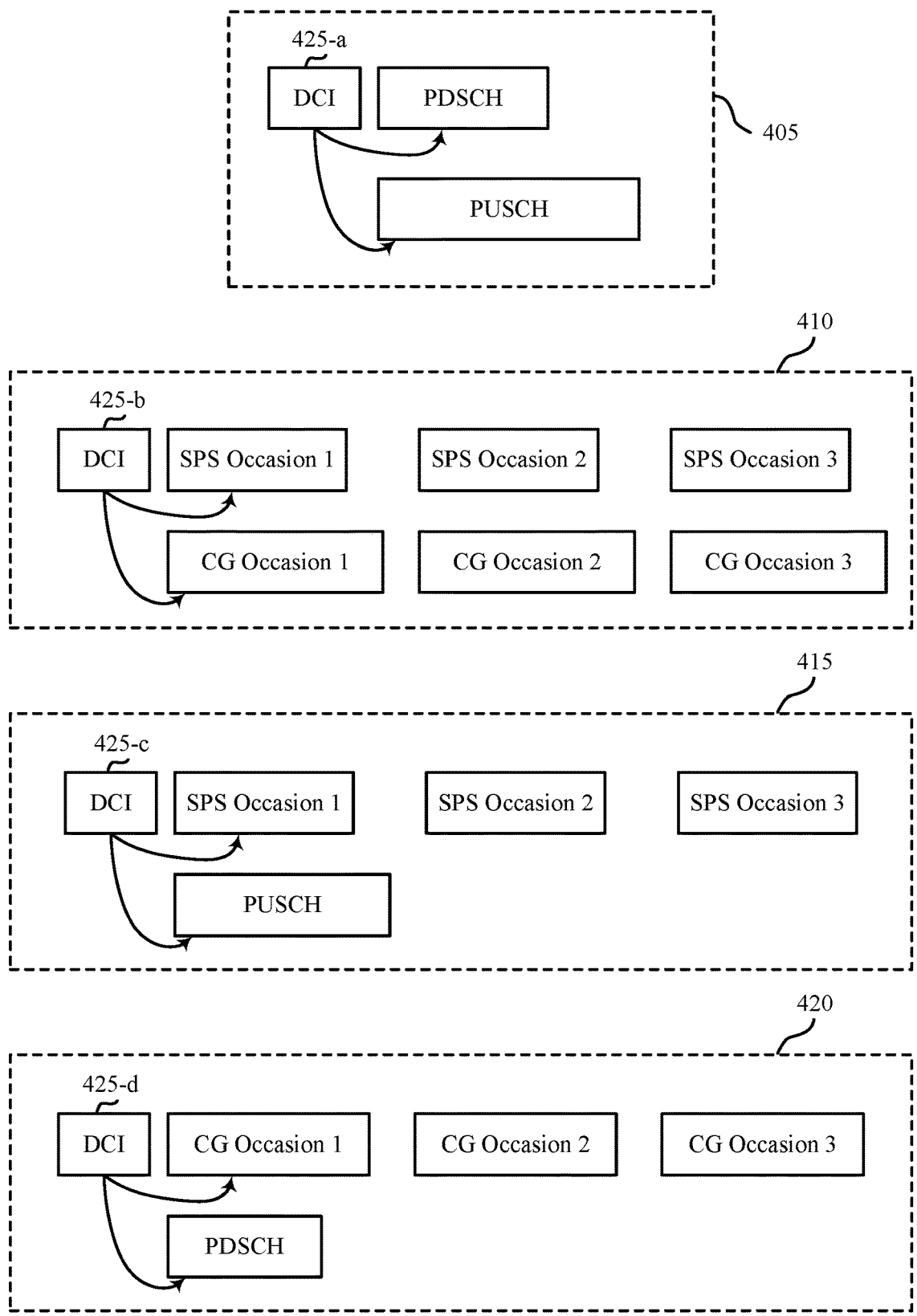

FIG. 4 illustrates example downlink and uplink signaling configurations 400 that supports scheduling parameters for unequal downlink and uplink transmissions in accordance with aspects of the present disclosure. For example, the signaling configurations 400 may implemented between a base station and a UE that support both half-duplex and full-duplex communications, and which may be examples of a base station 105 and a UE 115 described with reference to FIGS. 1 and 2. In addition, the described techniques applying to downlink and uplink signaling configurations 400 may be similarly performed on other example uplink and downlink configurations.

Some wireless communications systems may support co-existing half-duplex transmissions and full-duplex transmissions. For example, in some cases, half-duplex downlink and uplink transmissions may be time division multiplexed, while full-duplex downlink and uplink transmissions scheduled at the same time resources may be spatial division multiplexed or frequency division multiplexed (SDM/FDM).

In some other cases, however, full-duplex downlink and uplink transmissions may have unequal durations. For example, in signaling configurations 400, an uplink transmission may occupy a greater number of symbols than a downlink transmission. In a first example overlap configuration 405, the DCI 425-a schedules a PUSCH transmission that occupies a greater number of uplink symbols than a scheduled PDSCH, and the resources allocated for the PDSCH overlaps with resources allocated for the PUSCH. While one DCI 425 is shown as scheduling the PDSCH and PUSCH, multiple (e.g., two) different DCIs 425 may respectively schedule PDSCH and PUSCH in this and other examples provided herein. In a second example overlap configuration 410, DCI 425-b activates downlink SPS and an uplink configured grant for downlink and uplink transmissions. In the example of 410, the downlink SPS occasions 1, 2, and 3 may occupy a fewer symbols than each of the corresponding uplink configured grant occasions 1, 2, and 3. In a third example overlap configuration 415, DCI 425-c may activate downlink SPS and may schedule a PUSCH transmission on uplink resources, and the PUSCH transmission may occupy a greater number of symbols than at least the number of symbols occupied by SPS occasion 1. In a fourth example overlap configuration 420, DCI 425-d may activate an uplink configured grant and may allocate a number of downlink resources for receiving a PDSCH transmission that is shorter in length than the activated uplink configured grant resources.

Based on the unequal durations for the downlink and uplink transmissions in the example overlap configurations 405, 410, 415, and 420, there may be overlapping symbols or resources and non-overlapping symbols or resources between the uplink and downlink resources scheduled by DCI 425. Such overlap between symbols or resources may increase self-interference, and different transmission parameters may be used for overlapping and non-overlapping symbols to mitigate the self-interference. For example, based on information contained in the DCI or other scheduling message (e.g., RRC), the receiving UE may determine different values of MCS, transmission power, power offset, TPMI, RI, or other parameters for overlapping and non-overlapping symbols and resources for uplink transmissions.

In some examples, the base station may schedule two SRS transmissions on both overlapping resources and non-overlapping resources, and the base station may estimate the first MCS and the second MCS based on the two SRS transmissions.

In some other examples, the base station may schedule SRS transmissions on either overlapping resources or non-overlapping resources. In cases that the base station schedules SRS transmissions on overlapping resources, the UE may transmit additional information such as the power backoff offset value for the non-overlapping resource (e.g., the transmit power is +3 dB higher for the non-overlapping resource relative to the overlapping resources). In such cases, the base station may estimate the first MCS based on the SRS transmissions, and may estimate the second MCS based on the additional power backoff offset value information received from the UE.

In some other examples, the unequal downlink and uplink transmissions may be associated with a phase discontinuity between overlapping and non-overlapping symbols. In such examples, the UE may explicitly indicate whether there is phase discontinuity via capability signaling, or the UE may dynamically indicate the phase discontinuity via uplink control information or MAC-CE signaling.

Figure 5:
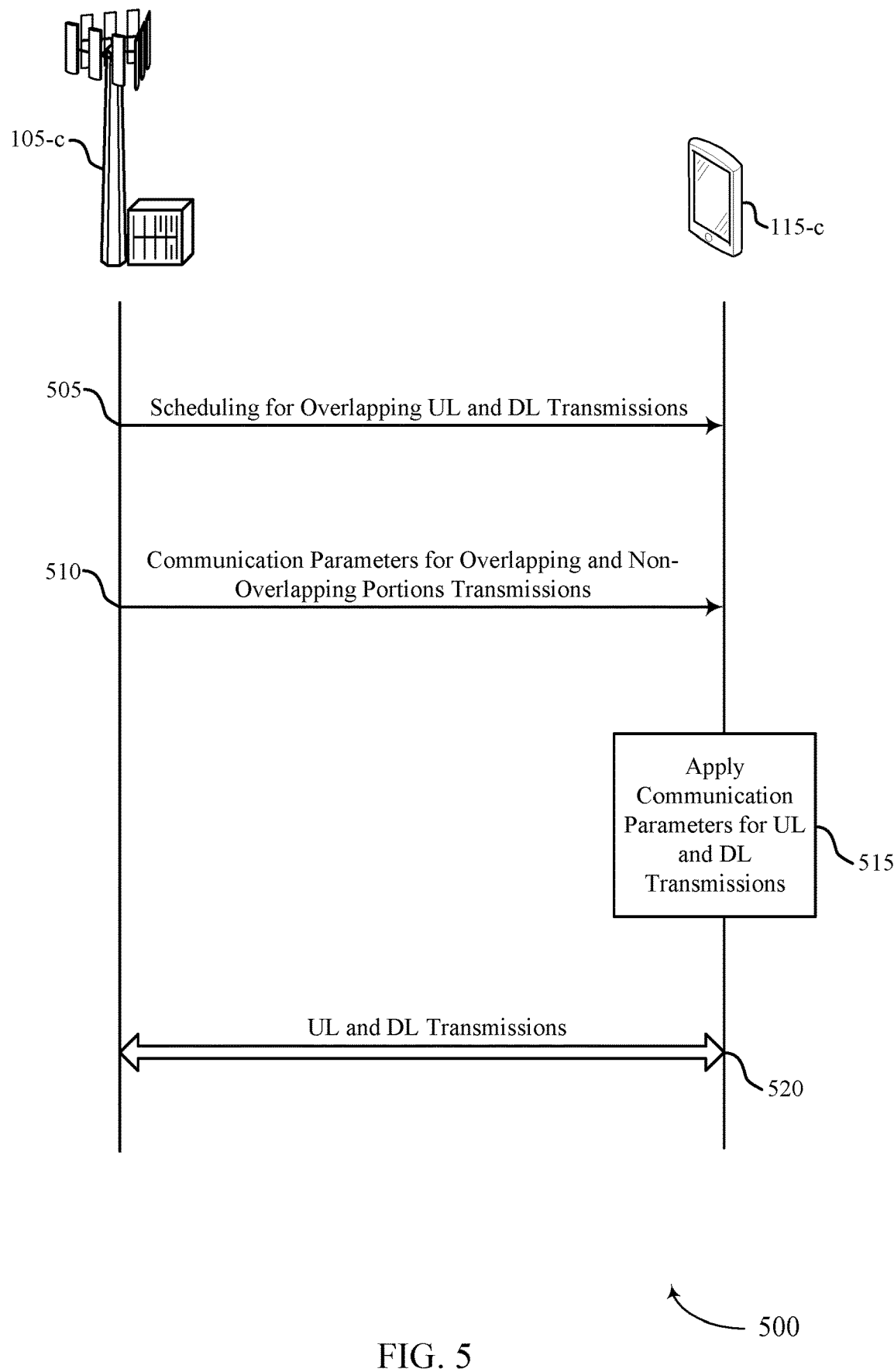
FIG. 5 illustrates an example of a process flow in a system that supports scheduling parameters for unequal downlink and uplink transmissions in accordance with aspects of the present disclosure.

FIG. 5 illustrates an example of a process flow 500 in a system that supports scheduling parameters for unequal downlink and uplink transmissions in accordance with aspects of the present disclosure. In some examples, the process flow 500 may implement or be implemented by aspects of the wireless communications system 100 and the wireless communications system 200. For example, the process flow 500 may illustrate communications between a base station 105-c and a UE 115-c, which may be examples of corresponding devices described herein with reference to FIGS. 1 and 2. In the following description of the process flow 500, operations between the base station 105-c and the UE 115-c may be performed in a different order or at a different time than as shown. Some operations may also be omitted from the process flow 500, and other operations may be added to the process flow 500. In some examples, the base station 105-c and the UE 115-c may communicate (e.g., using full-duplex communications, half-duplex communications, or both) with one or more other devices (not shown), such as described with reference to FIG. 2.

At 505, the UE 115-c may receive, from base station 105-c, one or more messages that schedule a number of uplink resources allocated for one or more uplink transmissions, and one or more downlink resources allocated for one or more downlink transmissions. In some cases, at least portion of the uplink resources and the downlink resources at least partially overlap in a time domain. For example, the UE 115-c may identify the overlap based on a difference in a duration of the one or more uplink transmissions and a respective duration of the one or more downlink transmissions.

In some cases, the uplink transmission of the one or more uplink transmissions has a longer duration relative to a duration of a downlink transmission of the one or more downlink transmissions, or the uplink transmission of the one or more uplink transmissions has a shorter duration relative to a duration of a downlink transmission of the one or more downlink transmissions.

At 510, the UE 115-c may receive, from the base station 105-c, a configuration of a first set of communication parameters and a second set of communication parameters different than the first set of communication parameters. In some cases, the first set of communication parameters are configured for the overlapping portion of the uplink resources and the downlink resources, and the second set of communication parameters are configured for a non-overlapping portion of the uplink resources, a non-overlapping portion of the downlink resources, or a combination thereof.

In some examples, the first set of communication parameters correspond to first MCS values, first transmission power values, first TPMI values, first rank indication values, or any combination thereof, and the second set of communication parameters correspond to second MCS values, second transmission power values, second TPMI values, second rank indication values, or any combination thereof.

In some examples, the first set of communication parameters include a first transmission power and the second set of communication parameters include a second transmission power which is different than the first transmission power. The UE 115-c may receive the communication parameters in one or more fields of a DCI (e.g., the one or more messages scheduling uplink and downlink resources), and the one or more fields may include an indication of the first transmission power and the second transmission power or a power offset between the overlapping portion of the uplink resources and the downlink resources. Based on receiving the indications of transmission powers, the UE 115-c may adjust an automatic gain control for the first transmission power and the second transmission power.

In some examples, based on the received scheduling, the UE 115-c may identify a time gap between the overlapping portion and the non-overlapping portion of the uplink resources or the non-overlapping portion of the downlink resources. The UE 115-c may adjust an automatic gain control for the first transmission power and the second transmission power during the time gap.

In some examples, the UE 115-c may receive, in the one or more messages, an indication of whether a phase discontinuity exists between the overlapping portion and the non-overlapping portion of the uplink resources or the non-overlapping portion of the downlink resources. In some other cases, the UE 115-c may identify the phase discontinuity, and the UE 115-c may transmit an indication of the phase discontinuity to the base station (e.g., in a capability message, an uplink control message, or a combination thereof). To account for the identified discontinuity, the UE 115-c may apply one or more phase discontinuity adjustments in accordance with a set of phase discontinuity adjustment rules based on the indication. In some examples, the UE may identify a single use DMRS or a DMRS for re-use for performing channel estimation and power adjustment based on the set of phase discontinuity adjustment rules. In some other examples, the one or more phase discontinuity adjustment rules may be based on a power offset (or a power offset threshold value) indicating the phase discontinuity between the overlapping portion and the non-overlapping portion of the uplink or downlink symbols.

In some examples, the first set of communication parameters includes a first MCS value and the second set of communication parameters includes a second MCS value different than the first MCS value. The UE 115-c may receive a first reference signal (e.g., a first CSI-RS, DMRS, etc.) on the overlapping portion of the downlink resources and a second reference signal (e.g., a second CSI-RS, DMRS, etc.) on the non-overlapping portion of the downlink resources. The UE 115-c may determine a value for the first MCS value based on the first reference signal, and a value for the second MCS value based on the second reference signal.

In some examples, the UE 115-c may receive, from the base station 105-c, a configuration indicating at least a portion of the overlapping uplink resources allocated for one or more SRS transmissions. The UE 115-c may then transmit, to the base station 105-c, the one or more SRS transmissions on the overlapping uplink resources in accordance with the configuration.

In some examples, the UE 115-c may transmit, to the base station 105-c, an indication of one or more transmission parameters for the other overlapping portion of the uplink resources or the non-overlapping portion of the uplink resources based on the one or more SRS transmissions on the uplink resources. In some cases, the one or more transmission parameters for the other overlapping portion of the uplink resources or the non-overlapping portion of the uplink resources includes a transmission power backoff offset value.

At 515, the UE 115-c may apply the first set of communication parameters and the second set of communication parameters to the uplink resources and the downlink resources for communicating the one or more uplink transmissions and the one or more downlink transmissions with the base station 105-c.

At 520, the UE 115-c and the base station 105-c may communicate using the overlapping uplink and downlink transmissions in accordance with the application of the communication parameters to the overlapping and non-overlapping portions of the transmissions.

Figure 6:
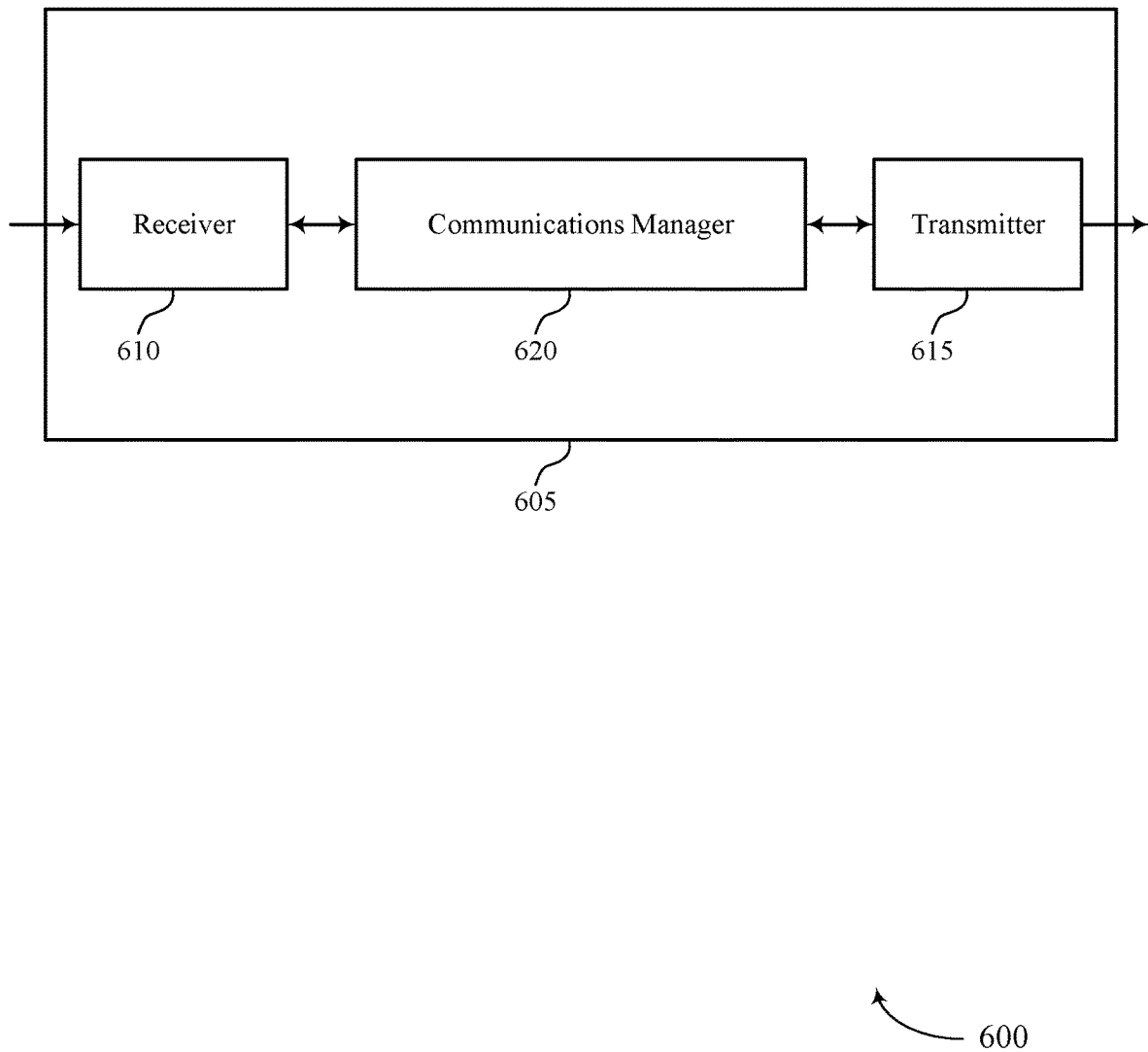
FIGS. 6 and 7 show block diagrams of devices that support scheduling parameters for unequal downlink and uplink transmissions in accordance with aspects of the present disclosure.

FIG. 6 shows a block diagram 600 of a device 605 that supports scheduling parameters for unequal downlink and uplink transmissions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to scheduling parameters for unequal downlink and uplink transmissions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to scheduling parameters for unequal downlink and uplink transmissions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of scheduling parameters for unequal downlink and uplink transmissions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The communications manager 620 may be configured as or otherwise support a means for receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The communications manager 620 may be configured as or otherwise support a means for applying the first set of communication parameters and the second set of communication parameters to the uplink resources and the downlink resources for communicating the one or more uplink transmissions and the one or more downlink transmissions with the base station.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources, more efficient processing, and improved device coordination.

Figure 7:
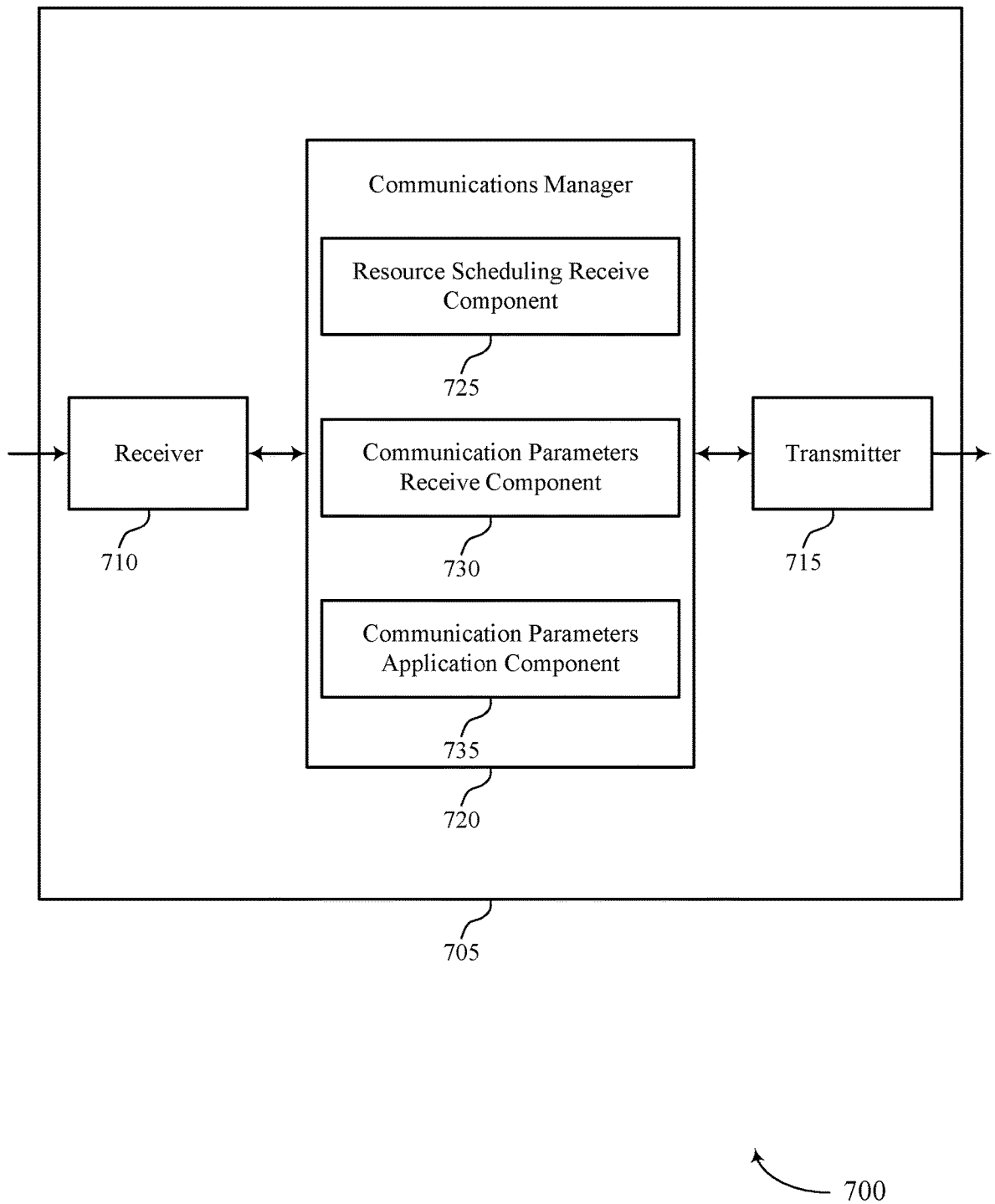

FIG. 7 shows a block diagram 700 of a device 705 that supports scheduling parameters for unequal downlink and uplink transmissions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to scheduling parameters for unequal downlink and uplink transmissions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to scheduling parameters for unequal downlink and uplink transmissions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of scheduling parameters for unequal downlink and uplink transmissions as described herein. For example, the communications manager 720 may include a resource scheduling receive component 725, a communication parameters receive component 730, a communication parameters application component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The resource scheduling receive component 725 may be configured as or otherwise support a means for receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The communication parameters receive component 730 may be configured as or otherwise support a means for receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The communication parameters application component 735 may be configured as or otherwise support a means for applying the first set of communication parameters and the second set of communication parameters to the uplink resources and the downlink resources for communicating the one or more uplink transmissions and the one or more downlink transmissions with the base station.

Figure 8:
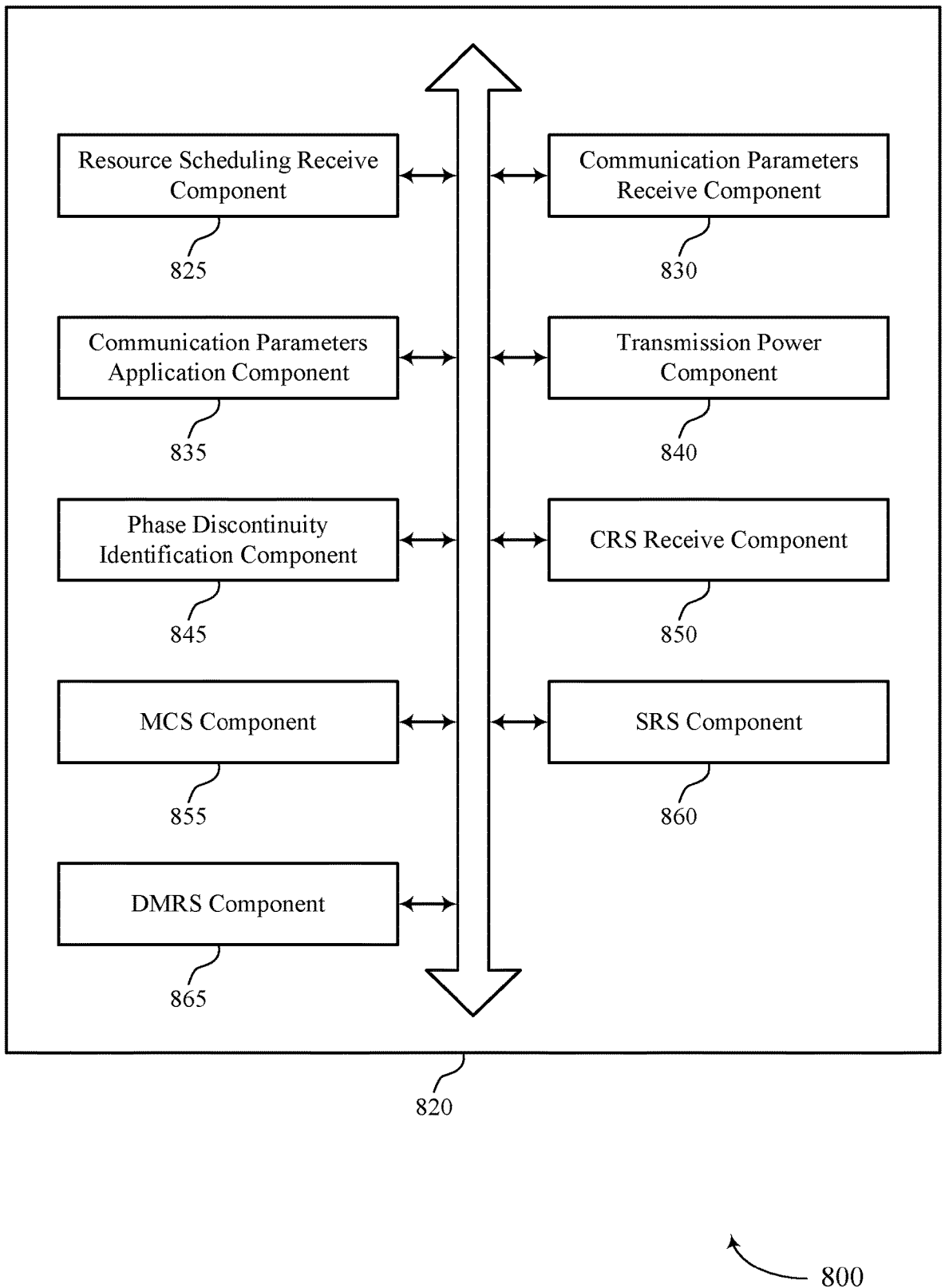
FIG. 8 shows a block diagram of a communications manager that supports scheduling parameters for unequal downlink and uplink transmissions in accordance with aspects of the present disclosure.

FIG. 8 shows a block diagram 800 of a communications manager 820 that supports scheduling parameters for unequal downlink and uplink transmissions in accordance with aspects of the present disclosure. The communications manager 820 may be an example of aspects of a communications manager 620, a communications manager 720, or both, as described herein. The communications manager 820, or various components thereof, may be an example of means for performing various aspects of scheduling parameters for unequal downlink and uplink transmissions as described herein. For example, the communications manager 820 may include a resource scheduling receive component 825, a communication parameters receive component 830, a communication parameters application component 835, a transmission power component 840, a phase discontinuity identification component 845, an CRS receive component 850, an MCS component 855, an SRS component 860, a DMRS component 865, or any combination thereof. Each of these components may communicate, directly or indirectly, with one another (e.g., via one or more buses).

The communications manager 820 may support wireless communications at a UE in accordance with examples as disclosed herein. The resource scheduling receive component 825 may be configured as or otherwise support a means for receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The communication parameters receive component 830 may be configured as or otherwise support a means for receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The communication parameters application component 835 may be configured as or otherwise support a means for applying the first set of communication parameters and the second set of communication parameters to the uplink resources and the downlink resources for communicating the one or more uplink transmissions and the one or more downlink transmissions with the base station.

In some examples, the first set of communication parameters includes a first transmission power and the second set of communication parameters includes a second transmission power different than the first transmission power, and the transmission power component 840 may be configured as or otherwise support a means for receiving, in one or more fields of the one or more messages scheduling uplink and downlink resources, an indication of the first transmission power and the second transmission power. In some examples, the first set of communication parameters includes a first transmission power and the second set of communication parameters includes a second transmission power different than the first transmission power, and the transmission power component 840 may be configured as or otherwise support a means for adjusting an automatic gain control for the first transmission power and the second transmission power based on the one or more fields.

In some examples, the one or more fields of the one or more messages scheduling the uplink resources and the downlink resources indicate a power offset between the overlapping portion of the uplink resources and the downlink resources.

In some examples, the first set of communication parameters correspond to a first transmission power and the second set of communication parameters correspond to a second transmission power different than the first transmission power, and the transmission power component 840 may be configured as or otherwise support a means for identifying, based on the one or more messages, a time period including a gap between the overlapping portion and the non-overlapping portion of the uplink resources or the non-overlapping portion of the downlink resources. In some examples, the first set of communication parameters correspond to a first transmission power and the second set of communication parameters correspond to a second transmission power different than the first transmission power, and the transmission power component 840 may be configured as or otherwise support a means for adjusting an automatic gain control during the time period based on the first transmission power and the second transmission power.

In some examples, the phase discontinuity identification component 845 may be configured as or otherwise support a means for receiving, in the one or more messages, an indication of whether a phase discontinuity exists between the overlapping portion and the non-overlapping portion of the uplink resources or the non-overlapping portion of the downlink resources. In some examples, the phase discontinuity identification component 845 may be configured as or otherwise support a means for applying one or more phase discontinuity adjustments in accordance with a set of phase discontinuity adjustment rules based on the indication.

In some examples, the phase discontinuity identification component 845 may be configured as or otherwise support a means for receiving, in the one or more messages, an indication of the phase discontinuity between the overlapping portion and the non-overlapping portion of the uplink resources or the non-overlapping portion of the downlink resources. In some examples, the DMRS component 865 may be configured as or otherwise support a means for identifying a single-use demodulation reference signal for channel estimation and power adjustment based on the set of phase discontinuity adjustment rules and the indication of the phase discontinuity.

In some examples, the phase discontinuity identification component 845 may be configured as or otherwise support a means for receiving, in the one or more messages, an indication of a phase continuity between the overlapping portion and the non-overlapping portion of the uplink resources or the non-overlapping portion of the downlink resources. In some examples, the DMRS component 865 may be configured as or otherwise support a means for identifying a demodulation reference signal to re-use for channel estimation and power adjustment based on the set of phase discontinuity adjustment rules and the indication of the phase continuity.

In some examples, the phase discontinuity identification component 845 may be configured as or otherwise support a means for receiving, in one or more fields of the one or more messages scheduling the uplink resources and the downlink resources, a power offset indicating a phase discontinuity between the overlapping portion and the non-overlapping portion of the uplink resources or the non-overlapping portion of the downlink resources. In some examples, the phase discontinuity identification component 845 may be configured as or otherwise support a means for applying one or more phase discontinuity adjustment rules based on the power offset.

In some examples, the power offset includes a power offset threshold, and the phase discontinuity identification component 845 may be configured as or otherwise support a means for comparing a measured power offset between the overlapping portion and the non-overlapping portion of the uplink resources or the non-overlapping portion of the downlink resources to the power offset threshold. In some examples, the power offset includes a power offset threshold, and the phase discontinuity identification component 845 may be configured as or otherwise support a means for applying one or more phase discontinuity adjustment rules based on the comparison.

In some examples, the first set of communication parameters includes a first modulation and coding scheme value and the second set of communication parameters includes a second modulation and coding scheme value different than the first modulation and coding scheme value, and the CRS receive component 850 may be configured as or otherwise support a means for receiving a first reference signal on the overlapping portion of the downlink resources and a second reference signal on the non-overlapping portion of the downlink resources. In some examples, the first set of communication parameters includes a first modulation and coding scheme value and the second set of communication parameters includes a second modulation and coding scheme value different than the first modulation and coding scheme value, and the MCS component 855 may be configured as or otherwise support a means for determining a value for the first modulation and coding scheme value based on the first reference signal and a value for the second modulation and coding scheme value based on the second reference signal.

In some examples, the first reference signal and the second reference signal include a channel state information reference signal, a demodulation reference signal, or a combination thereof.

In some examples, the SRS component 860 may be configured as or otherwise support a means for receiving, from the base station, a second configuration indicating at least a portion of the uplink resources allocated for one or more SRS transmissions. In some examples, the SRS component 860 may be configured as or otherwise support a means for transmitting, to the base station, the one or more SRS transmissions on the uplink resources in accordance with the second configuration.

In some examples, the uplink resources include the overlapping portion of the uplink resources and the non-overlapping portion of the uplink resources.

In some examples, the uplink resources include the overlapping portion of the uplink resources or the non-overlapping portion of the uplink resources, and the SRS component 860 may be configured as or otherwise support a means for transmitting, to the base station, an indication of one or more transmission parameters for the other of the overlapping portion of the uplink resources or the non-overlapping portion of the uplink resources based on the one or more SRS transmissions on the uplink resources, where the one or more transmission parameters for the other of the overlapping portion of the uplink resources or the non-overlapping portion of the uplink resources include a transmission power backoff offset value.

In some examples, the phase discontinuity identification component 845 may be configured as or otherwise support a means for identifying a phase discontinuity between the overlapping portion and the non-overlapping portion of the uplink resources or the non-overlapping portion of the downlink resources. In some examples, the phase discontinuity identification component 845 may be configured as or otherwise support a means for transmitting an indication of the phase discontinuity to the base station.

In some examples, to support transmitting the indication of the phase discontinuity, the phase discontinuity identification component 845 may be configured as or otherwise support a means for transmitting the indication of the phase discontinuity in a capability message, an uplink control message, or a combination thereof.

In some examples, the first set of communication parameters correspond to first modulation and coding scheme values, first transmission power values, first TPMI, first rank indication values, or any combination thereof, and the second set of communication parameters correspond to second modulation and coding scheme values, second transmission power values, second TPMI values, second rank indication values, or any combination thereof.

In some examples, the phase discontinuity identification component 845 may be configured as or otherwise support a means for identifying the portion of the uplink resources and the downlink resources that overlap based on a difference in a duration of the one or more uplink transmissions and a respective duration of the one or more downlink transmissions.

In some examples, an uplink transmission of the one or more uplink transmissions has a longer duration relative to a duration of a downlink transmission of the one or more downlink transmissions.

In some examples, an uplink transmission of the one or more uplink transmissions has a shorter duration relative to a duration of a downlink transmission of the one or more downlink transmissions.

In some examples, the one or more uplink transmissions and the one or more downlink transmissions include full-duplex transmissions, half-duplex transmissions, or a combination thereof.

Figure 9:
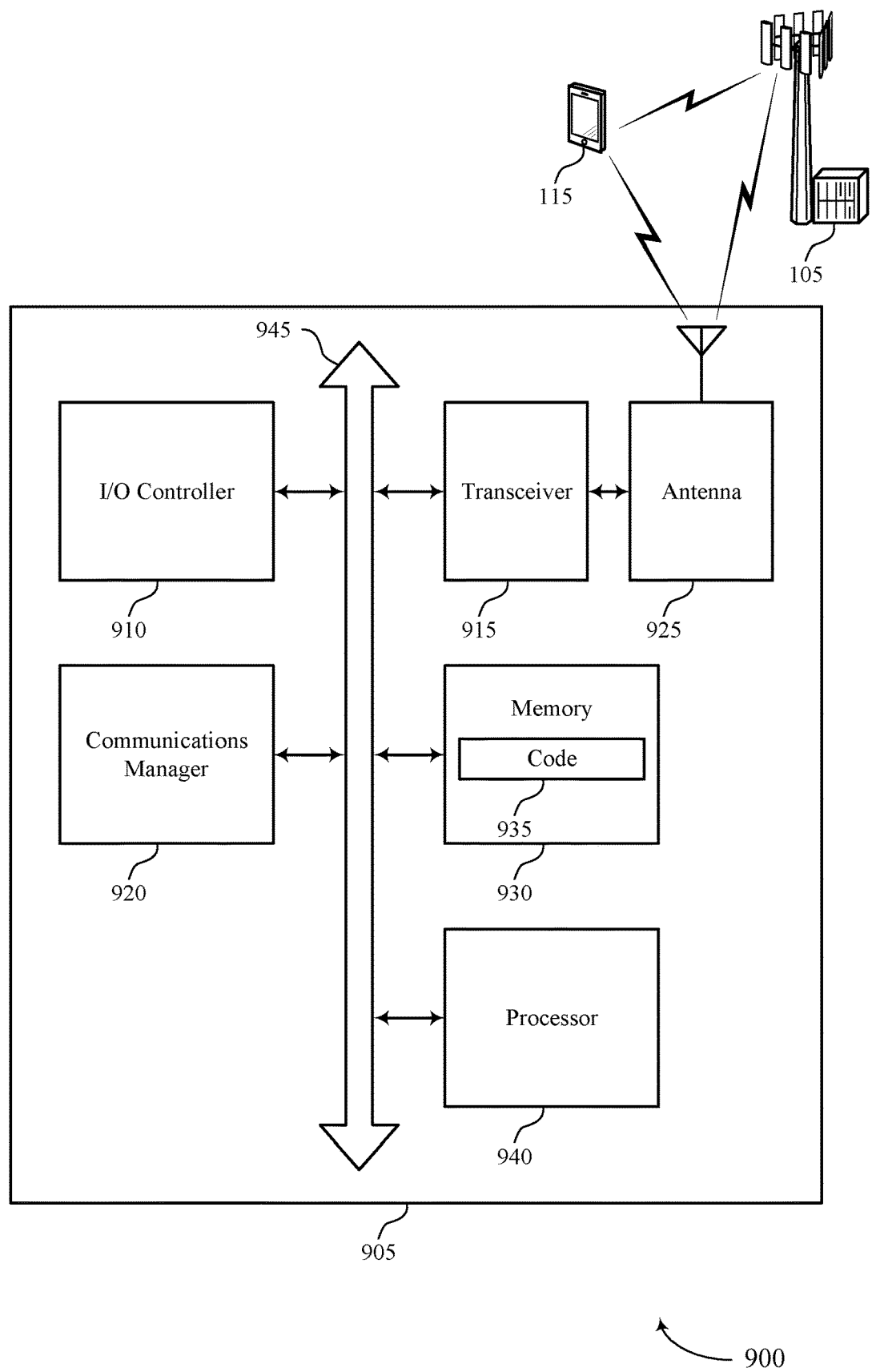
FIG. 9 shows a diagram of a system including a device that supports scheduling parameters for unequal downlink and uplink transmissions in accordance with aspects of the present disclosure.

FIG. 9 shows a diagram of a system 900 including a device 905 that supports scheduling parameters for unequal downlink and uplink transmissions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting scheduling parameters for unequal downlink and uplink transmissions). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The communications manager 920 may be configured as or otherwise support a means for receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The communications manager 920 may be configured as or otherwise support a means for applying the first set of communication parameters and the second set of communication parameters to the uplink resources and the downlink resources for communicating the one or more uplink transmissions and the one or more downlink transmissions with the base station.

By including or configuring the communications manager 920 in accordance with examples as described herein, the device 905 may support techniques for improved communication reliability, reduced latency, more efficient utilization of communication resources, improved coordination between devices, longer battery life, improved utilization of processing capability, and spectrum efficiency enhancement (e.g., per cell or per UE).

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of scheduling parameters for unequal downlink and uplink transmissions as described herein, or the processor 940 and the memory 930 may be otherwise configured to perform or support such operations.

Figure 10:
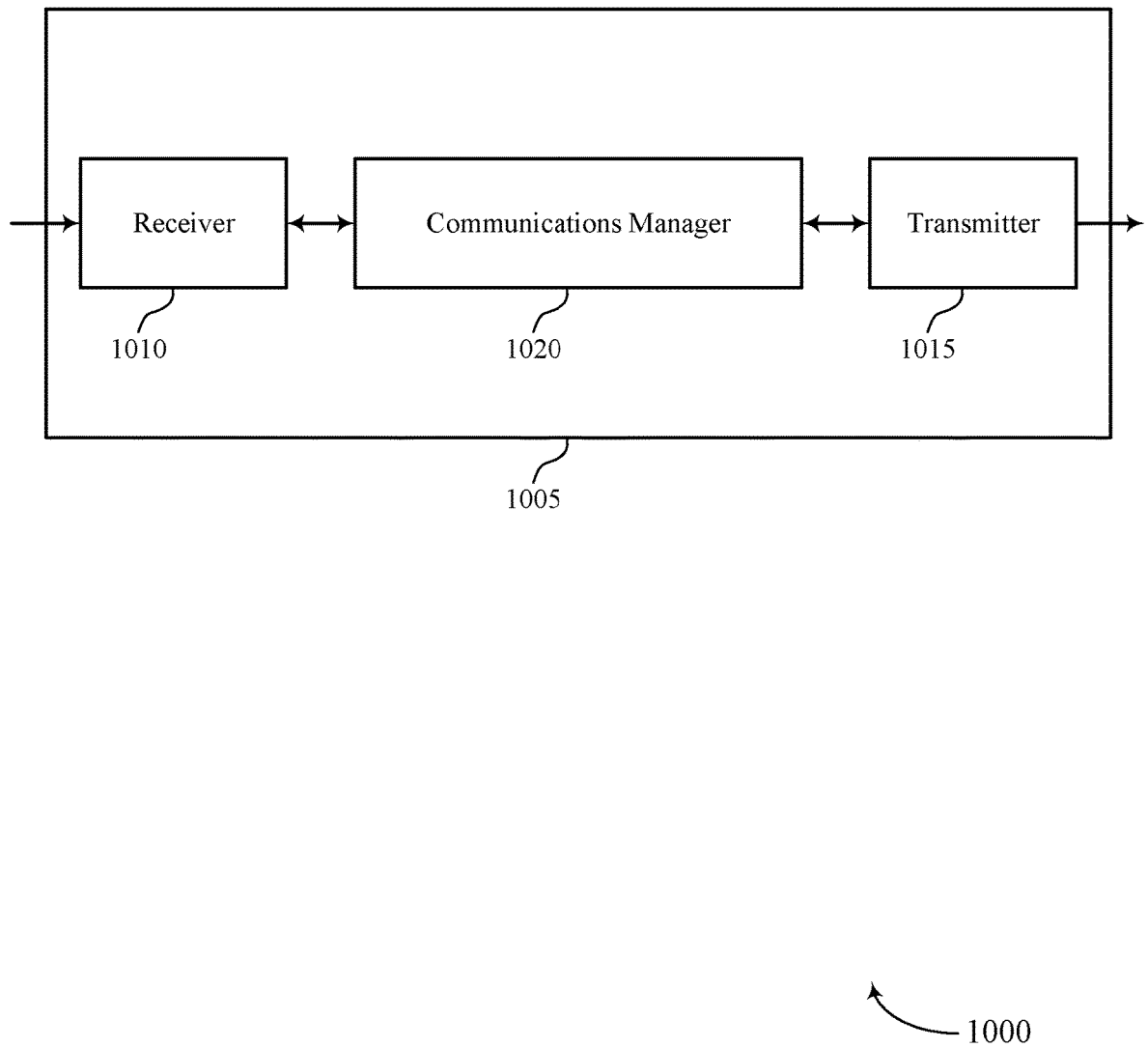
FIGS. 10 and 11 show block diagrams of devices that support scheduling parameters for unequal downlink and uplink transmissions in accordance with aspects of the present disclosure.

FIG. 10 shows a block diagram 1000 of a device 1005 that supports scheduling parameters for unequal downlink and uplink transmissions in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to scheduling parameters for unequal downlink and uplink transmissions). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to scheduling parameters for unequal downlink and uplink transmissions). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of scheduling parameters for unequal downlink and uplink transmissions as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, to a UE, one or more messages scheduling uplink resources allocated for one or more uplink transmissions and downlink resources allocated for one or more downlink transmissions, where a portion of the uplink resources and the downlink resources at least partially overlap in a time domain. The communications manager 1020 may be configured as or otherwise support a means for transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The communications manager 1020 may be configured as or otherwise support a means for receiving, from the UE, the one or more uplink transmissions in accordance with the first set of communication parameters and the second set of communication parameters.

Figure 11:
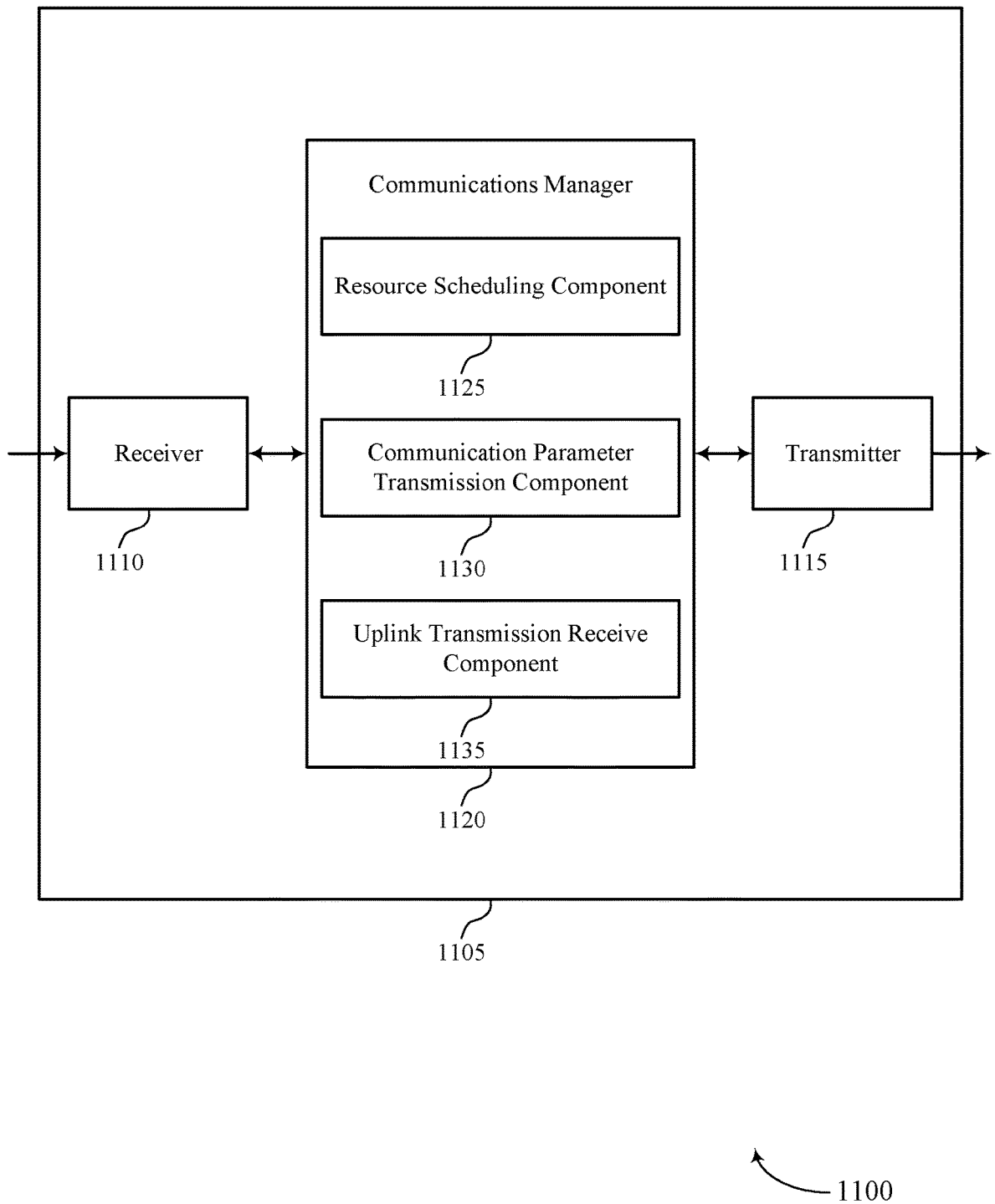

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources, more efficient processing, and improved device coordination FIG. 11 shows a block diagram 1100 of a device 1105 that supports scheduling parameters for unequal downlink and uplink transmissions in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to scheduling parameters for unequal downlink and uplink transmissions). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to scheduling parameters for unequal downlink and uplink transmissions). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of scheduling parameters for unequal downlink and uplink transmissions as described herein. For example, the communications manager 1120 may include a resource scheduling component 1125, a communication parameter transmission component 1130, an uplink transmission receive component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The resource scheduling component 1125 may be configured as or otherwise support a means for transmitting, to a UE, one or more messages scheduling uplink resources allocated for one or more uplink transmissions and downlink resources allocated for one or more downlink transmissions, where a portion of the uplink resources and the downlink resources at least partially overlap in a time domain. The communication parameter transmission component 1130 may be configured as or otherwise support a means for transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The uplink transmission receive component 1135 may be configured as or otherwise support a means for receiving, from the UE, the one or more uplink transmissions in accordance with the first set of communication parameters and the second set of communication parameters.

Figure 12:
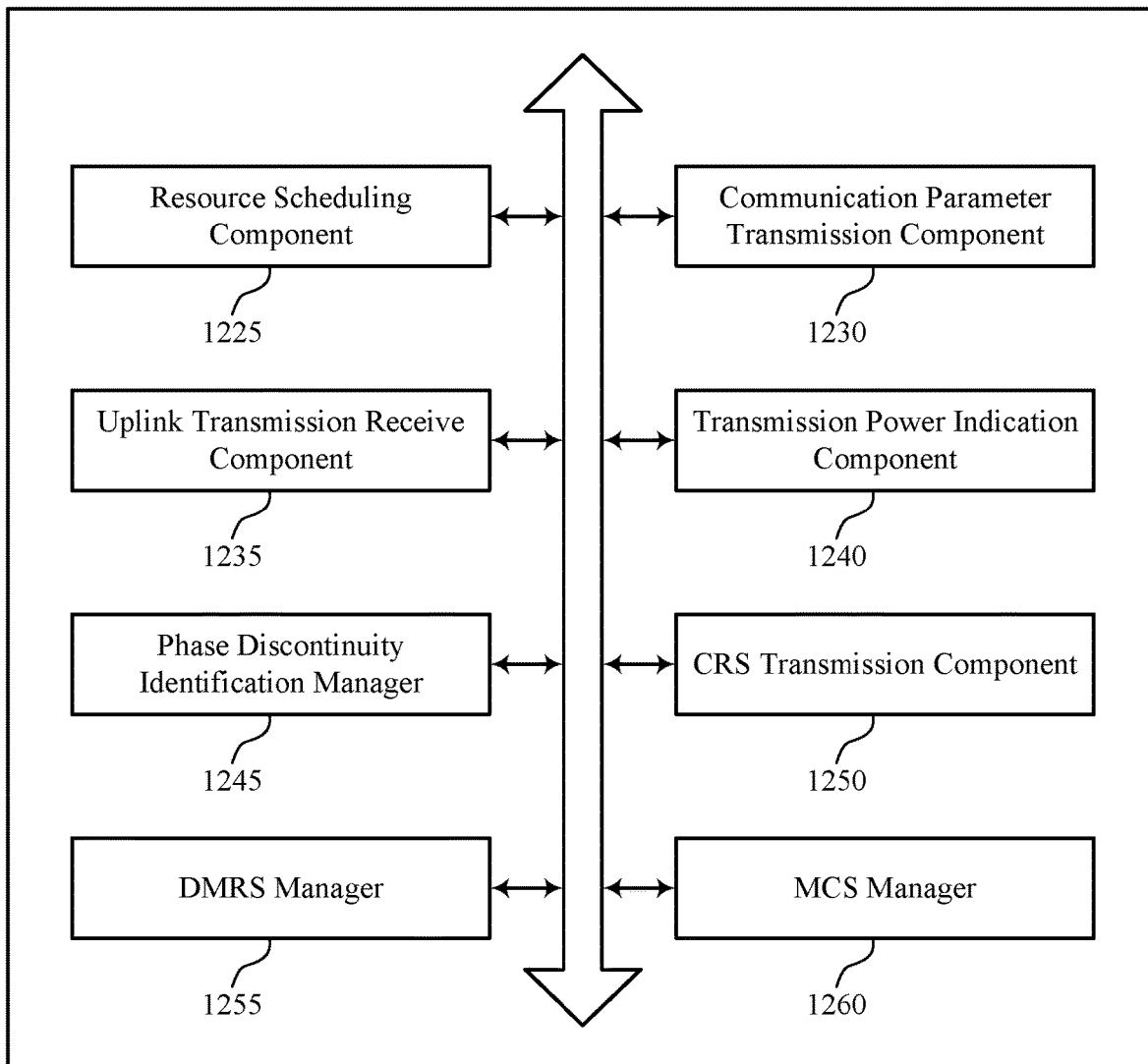
FIG. 12 shows a block diagram of a communications manager that supports scheduling parameters for unequal downlink and uplink transmissions in accordance with aspects of the present disclosure.

FIG. 12 shows a block diagram 1200 of a communications manager 1220 that supports scheduling parameters for unequal downlink and uplink transmissions in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of scheduling parameters for unequal downlink and uplink transmissions as described herein. For example, the communications manager 1220 may include a resource scheduling component 1225, a communication parameter transmission component 1230, an uplink transmission receive component 1235, a transmission power indication component 1240, a phase discontinuity identification manager 1245, an CRS transmission component 1250, a DMRS manager 1255, an MCS manager 1260, or any combination thereof. Each of these components may communicate, directly or indirectly, with one another (e.g., via one or more buses).

The communications manager 1220 may support wireless communications at a base station in accordance with examples as disclosed herein. The resource scheduling component 1225 may be configured as or otherwise support a means for transmitting, to a UE, one or more messages scheduling uplink resources allocated for one or more uplink transmissions and downlink resources allocated for one or more downlink transmissions, where a portion of the uplink resources and the downlink resources at least partially overlap in a time domain. The communication parameter transmission component 1230 may be configured as or otherwise support a means for transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The uplink transmission receive component 1235 may be configured as or otherwise support a means for receiving, from the UE, the one or more uplink transmissions in accordance with the first set of communication parameters and the second set of communication parameters.

In some examples, the first set of communication parameters includes a first transmission power and the second set of communication parameters includes a second transmission power different than the first transmission power, and the transmission power indication component 1240 may be configured as or otherwise support a means for transmitting, in one or more fields of the one or more messages scheduling uplink and downlink resources, an indication of the first transmission power and the second transmission power. In some examples, the first set of communication parameters includes a first transmission power and the second set of communication parameters includes a second transmission power different than the first transmission power, and the transmission power indication component 1240 may be configured as or otherwise support a means for applying the first transmission power to the overlapping portion of the uplink resources and the second transmission power to the non-overlapping portion of the uplink resources, a non-overlapping portion of the downlink resources, or a combination thereof.

In some examples, the one or more fields of the one or more messages scheduling the uplink resources and the downlink resources indicate a power offset between the overlapping portion of the uplink resources and the downlink resources.

In some examples, the first set of communication parameters correspond to a first transmission power and the second set of communication parameters correspond to a second transmission power different than the first transmission power, and the resource scheduling component 1225 may be configured as or otherwise support a means for allocating a time gap between the overlapping portion and the non-overlapping portion of the uplink resources or the non-overlapping portion of the downlink resources for the UE to use to perform automatic gain control based on the first transmission power and the second transmission power.

In some examples, the phase discontinuity identification manager 1245 may be configured as or otherwise support a means for transmitting, in the one or more messages, an indication of whether a phase discontinuity exists between the overlapping portion and the non-overlapping portion of the uplink resources or the non-overlapping portion of the downlink resources. In some examples, the phase discontinuity identification manager 1245 may be configured as or otherwise support a means for receiving the one or more uplink transmissions in accordance with a set of phase discontinuity adjustment rules applied by the UE based on the indication.

In some examples, the phase discontinuity identification manager 1245 may be configured as or otherwise support a means for transmitting, in the one or more messages, an indication of the phase discontinuity between the overlapping portion and the non-overlapping portion of the uplink resources or the non-overlapping portion of the downlink resources. In some examples, the DMRS manager 1255 may be configured as or otherwise support a means for transmitting a single-use demodulation reference signal for channel estimation and power adjustment based on the set of phase discontinuity adjustment rules and the indication of the phase discontinuity. In some examples, the DMRS manager 1255 may be configured as or otherwise support a means for transmitting a demodulation reference signal to re-use for channel estimation and power adjustment based on the set of phase discontinuity adjustment rules and the indication of the phase discontinuity.

In some examples, the phase discontinuity identification manager 1245 may be configured as or otherwise support a means for transmitting, in one or more fields of the one or more messages scheduling the uplink resources and the downlink resources, an indication of one or more phase discontinuity adjustment rules associated with a power offset for a phase discontinuity between the overlapping portion and the non-overlapping portion of the uplink resources or the non-overlapping portion of the downlink resources.

In some examples, the power offset includes a power offset threshold, and the uplink transmission receive component 1235 may be configured as or otherwise support a means for receiving the one or more uplink transmissions in accordance with the one or more phase discontinuity adjustment rules and the power offset threshold for the overlapping portion and the non-overlapping portion of the uplink resources or the non-overlapping portion of the downlink resources.

In some examples, the first set of communication parameters includes a first modulation and coding scheme value and the second set of communication parameters includes a second modulation and coding scheme value different than the first modulation and coding scheme value, and the CRS transmission component 1250 may be configured as or otherwise support a means for transmitting a first reference signal on the overlapping portion of the downlink resources and a second reference signal on the non-overlapping portion of the downlink resources.

In some examples, the first reference signal and the second reference signal include a channel state information reference signal, a demodulation reference signal, or a combination thereof.

In some examples, the resource scheduling component 1225 may be configured as or otherwise support a means for transmitting, to the UE, a configuration indicating at least a portion of the uplink resources allocated for one or more SRS transmissions. In some examples, the uplink transmission receive component 1235 may be configured as or otherwise support a means for receiving, from the UE, the one or more SRS transmissions on the uplink resources in accordance with the configuration.

In some examples, the uplink resources include the overlapping portion of the uplink resources and the non-overlapping portion of the uplink resources.

In some examples, the uplink transmission receive component 1235 may be configured as or otherwise support a means for receiving a first SRS transmission on the overlapping portion of the uplink resources and the downlink resources, and a second SRS transmission on the non-overlapping portion of the uplink resources and the downlink resources. In some examples, the MCS manager 1260 may be configured as or otherwise support a means for estimating a first modulation and coding scheme value and a second modulation and coding scheme value based on the first SRS transmission and the second SRS transmission.

In some examples, the phase discontinuity identification manager 1245 may be configured as or otherwise support a means for receiving, from the UE, an indication of a phase discontinuity between the overlapping portion and the non-overlapping portion of the uplink resources or the non-overlapping portion of the downlink resources.

In some examples, the uplink transmission receive component 1235 may be configured as or otherwise support a means for receiving the indication of the phase discontinuity in a capability message, an uplink control message, or a combination thereof.

In some examples, the first set of communication parameters correspond to first modulation and coding scheme values, first transmission power values, first TPMI values, first rank indication values, or any combination thereof, and the second set of communication parameters correspond to second modulation and coding scheme values, second transmission power values, second TPMI values, second rank indication values, or any combination thereof.

In some examples, the resource scheduling component 1225 may be configured as or otherwise support a means for identifying the portion of the uplink resources and the downlink resources that overlap based on a difference in a duration of the one or more uplink transmissions and a respective duration of the one or more downlink transmissions.

In some examples, an uplink transmission of the one or more uplink transmissions has a longer duration relative to a duration of a downlink transmission of the one or more downlink transmissions.

In some examples, an uplink transmission of the one or more uplink transmissions has a shorter duration relative to a duration of a downlink transmission of the one or more downlink transmissions.

Figure 13:
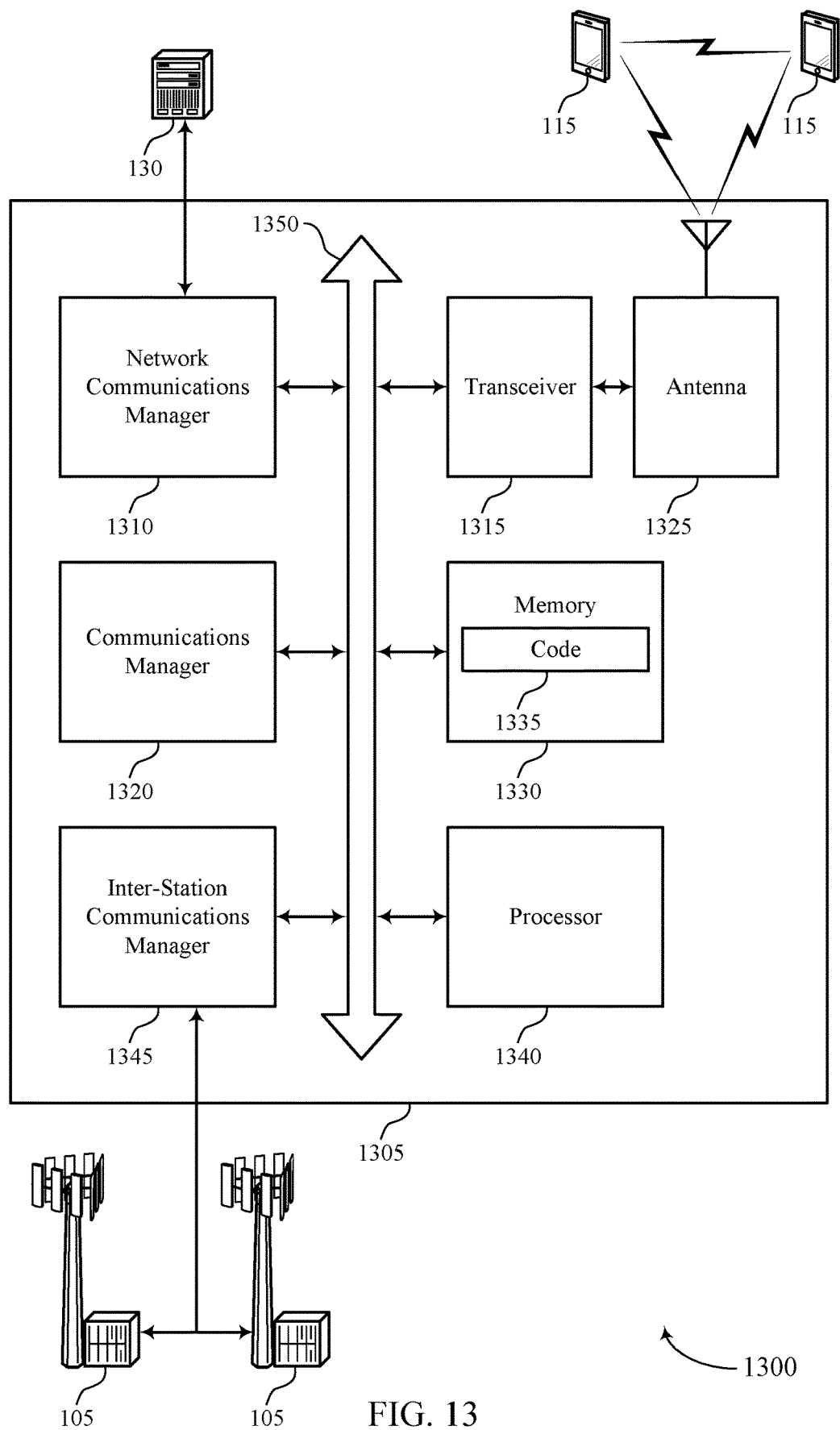
FIG. 13 shows a diagram of a system including a device that supports scheduling parameters for unequal downlink and uplink transmissions in accordance with aspects of the present disclosure.

FIG. 13 shows a diagram of a system 1300 including a device 1305 that supports scheduling parameters for unequal downlink and uplink transmissions in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting scheduling parameters for unequal downlink and uplink transmissions). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, to a UE, one or more messages scheduling uplink resources allocated for one or more uplink transmissions and downlink resources allocated for one or more downlink transmissions, where a portion of the uplink resources and the downlink resources at least partially overlap in a time domain. The communications manager 1320 may be configured as or otherwise support a means for transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The communications manager 1320 may be configured as or otherwise support a means for receiving, from the UE, the one or more uplink transmissions in accordance with the first set of communication parameters and the second set of communication parameters.

By including or configuring the communications manager 1320 in accordance with examples as described herein, the device 1305 may support techniques for improved communication reliability, reduced latency, more efficient utilization of communication resources, improved coordination between devices, longer battery life, improved utilization of processing capability, and spectrum efficiency enhancement (e.g., per cell or per UE).

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of scheduling parameters for unequal downlink and uplink transmissions as described herein, or the processor 1340 and the memory 1330 may be otherwise configured to perform or support such operations.

Figure 14:
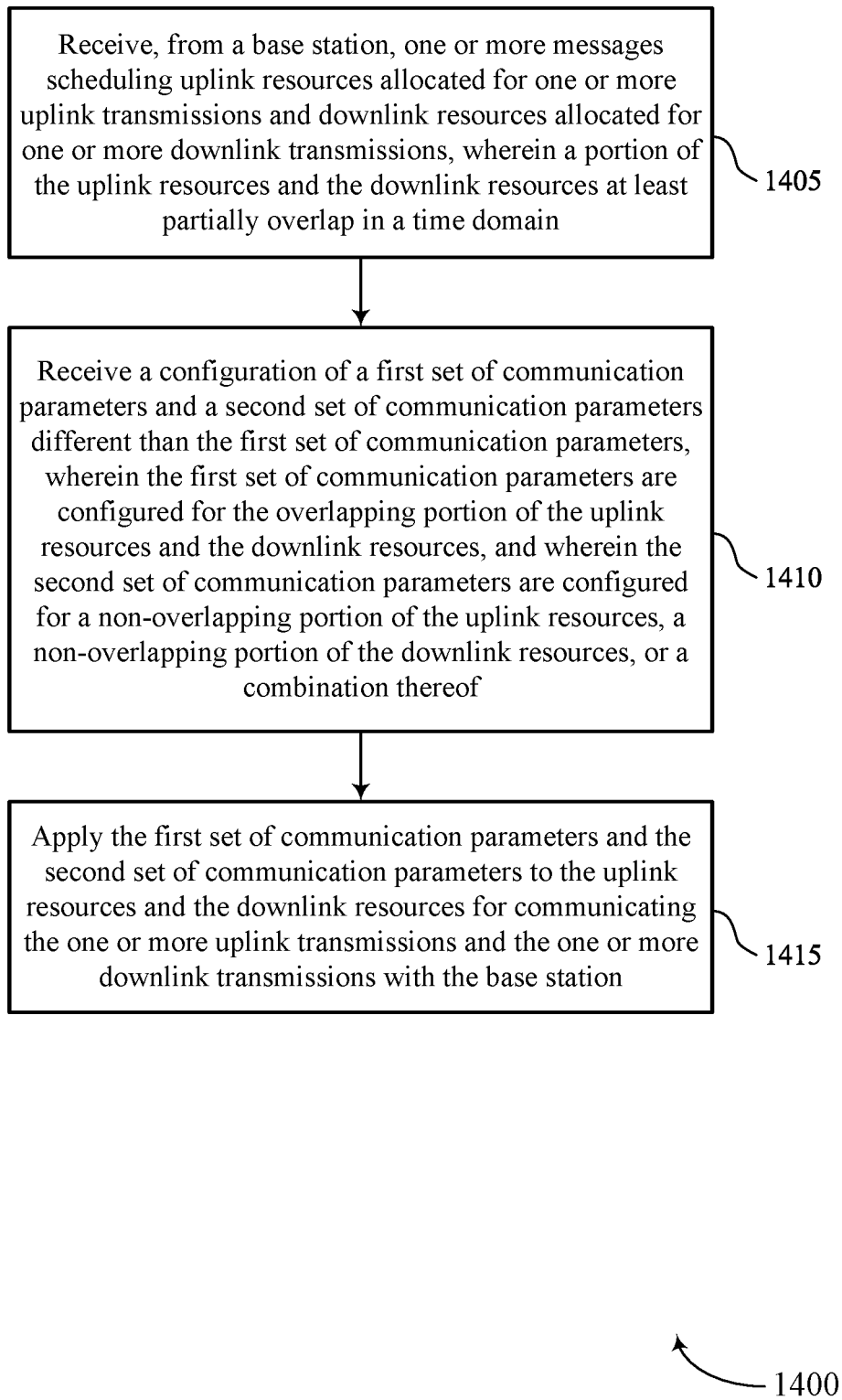
FIGS. 14 through 21 show flowcharts illustrating methods that support scheduling parameters for unequal downlink and uplink transmissions in accordance with aspects of the present disclosure.

FIG. 14 shows a flowchart illustrating a method 1400 that supports scheduling parameters for unequal downlink and uplink transmissions in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The operations of 1405 may be performed in accordance with examples as disclosed herein. In some examples, aspects of the operations of 1405 may be performed by a resource scheduling receive component 825 as described with reference to FIG. 8.

At 1410, the method may include receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 1410 may be performed in accordance with examples as disclosed herein. In some examples, aspects of the operations of 1410 may be performed by a communication parameters receive component 830 as described with reference to FIG. 8.

At 1415, the method may include applying the first set of communication parameters and the second set of communication parameters to the uplink resources and the downlink resources for communicating the one or more uplink transmissions and the one or more downlink transmissions with the base station. The operations of 1415 may be performed in accordance with examples as disclosed herein. In some examples, aspects of the operations of 1415 may be performed by a communication parameters application component 835 as described with reference to FIG. 8.

Figure 15:
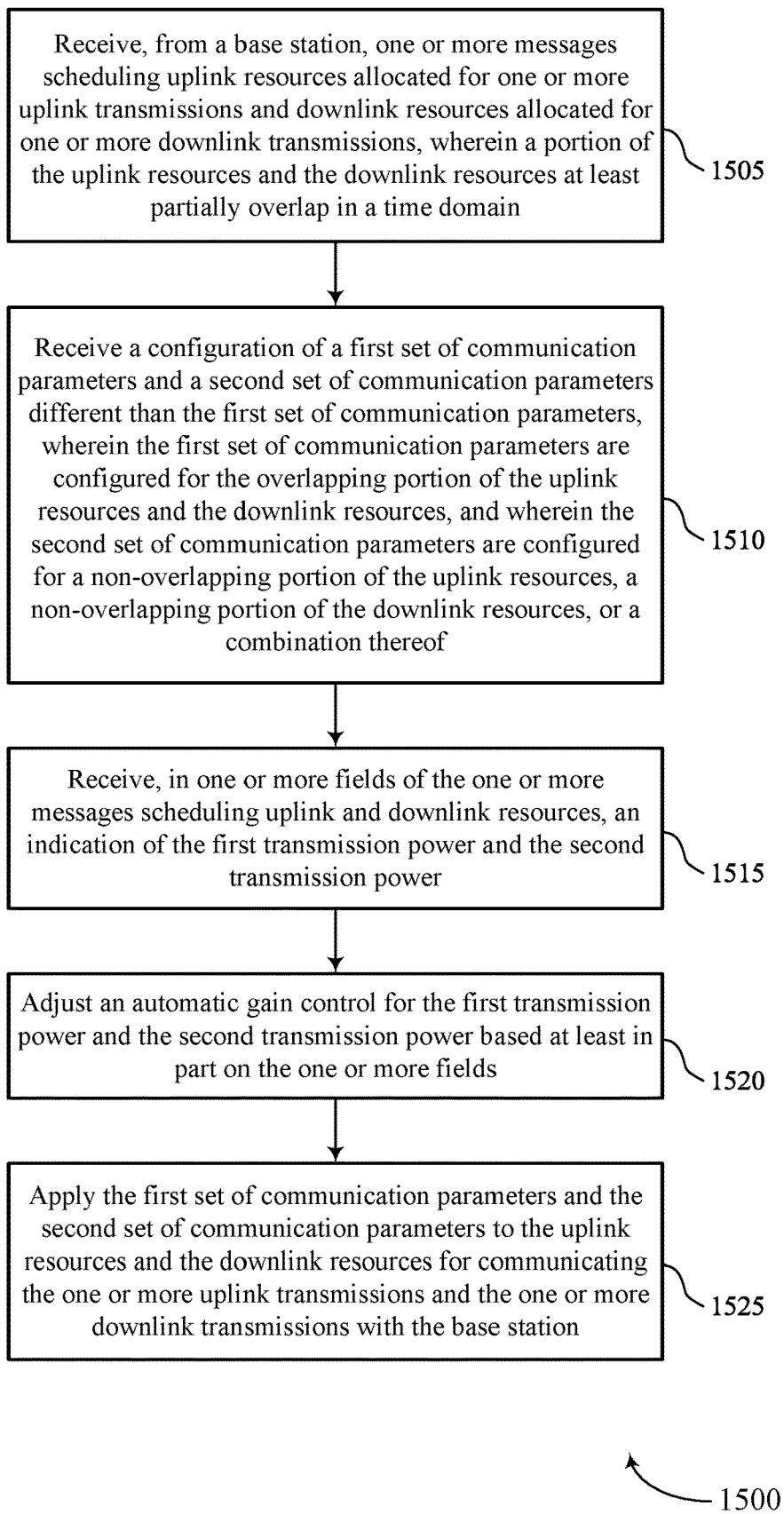

FIG. 15 shows a flowchart illustrating a method 1500 that supports scheduling parameters for unequal downlink and uplink transmissions in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The operations of 1505 may be performed in accordance with examples as disclosed herein. In some examples, aspects of the operations of 1505 may be performed by a resource scheduling receive component 825 as described with reference to FIG. 8.

At 1510, the method may include receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 1510 may be performed in accordance with examples as disclosed herein. In some examples, aspects of the operations of 1510 may be performed by a communication parameters receive component 830 as described with reference to FIG. 8.

At 1515, the method may include receiving, in one or more fields of the one or more messages scheduling uplink and downlink resources, an indication of the first transmission power and the second transmission power. The operations of 1515 may be performed in accordance with examples as disclosed herein. In some examples, aspects of the operations of 1515 may be performed by a transmission power component 840 as described with reference to FIG. 8.

At 1520, the method may include adjusting an automatic gain control for the first transmission power and the second transmission power based on the one or more fields. The operations of 1520 may be performed in accordance with examples as disclosed herein. In some examples, aspects of the operations of 1520 may be performed by a transmission power component 840 as described with reference to FIG. 8.

At 1525, the method may include applying the first set of communication parameters and the second set of communication parameters to the uplink resources and the downlink resources for communicating the one or more uplink transmissions and the one or more downlink transmissions with the base station. The operations of 1525 may be performed in accordance with examples as disclosed herein. In some examples, aspects of the operations of 1525 may be performed by a communication parameters application component 835 as described with reference to FIG. 8.

Figure 16:
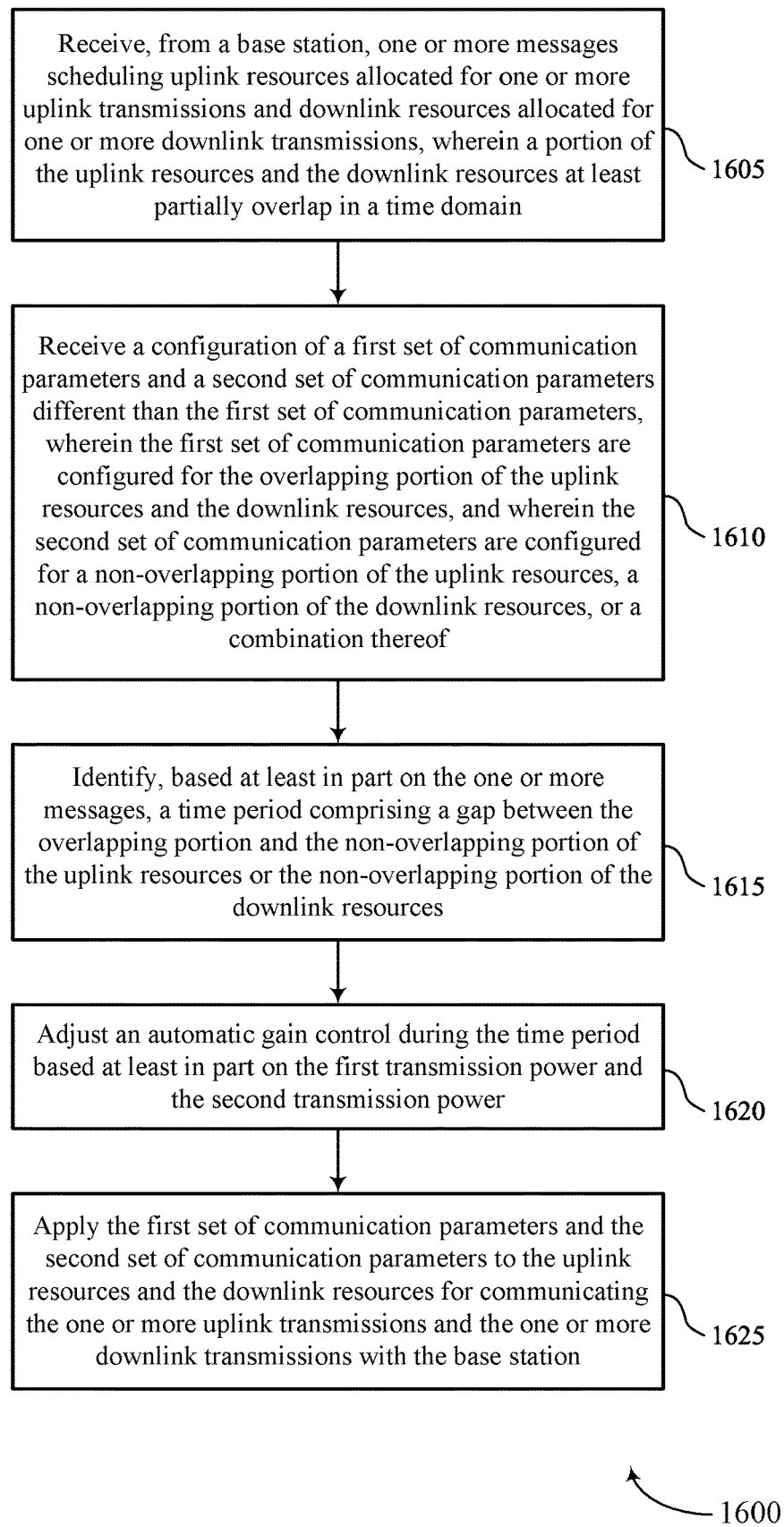

FIG. 16 shows a flowchart illustrating a method 1600 that supports scheduling parameters for unequal downlink and uplink transmissions in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The operations of 1605 may be performed in accordance with examples as disclosed herein. In some examples, aspects of the operations of 1605 may be performed by a resource scheduling receive component 825 as described with reference to FIG. 8.

At 1610, the method may include receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 1610 may be performed in accordance with examples as disclosed herein. In some examples, aspects of the operations of 1610 may be performed by a communication parameters receive component 830 as described with reference to FIG. 8.

At 1615, the method may include identifying, based on the one or more messages, a time period including a gap between the overlapping portion and the non-overlapping portion of the uplink resources or the non-overlapping portion of the downlink resources. The operations of 1615 may be performed in accordance with examples as disclosed herein. In some examples, aspects of the operations of 1615 may be performed by a transmission power component 840 as described with reference to FIG. 8.

At 1620, the method may include adjusting an automatic gain control during the time period based on the first transmission power and the second transmission power. The operations of 1620 may be performed in accordance with examples as disclosed herein. In some examples, aspects of the operations of 1620 may be performed by a transmission power component 840 as described with reference to FIG. 8.

At 1625, the method may include applying the first set of communication parameters and the second set of communication parameters to the uplink resources and the downlink resources for communicating the one or more uplink transmissions and the one or more downlink transmissions with the base station. The operations of 1625 may be performed in accordance with examples as disclosed herein. In some examples, aspects of the operations of 1625 may be performed by a communication parameters application component 835 as described with reference to FIG. 8.

Figure 17:
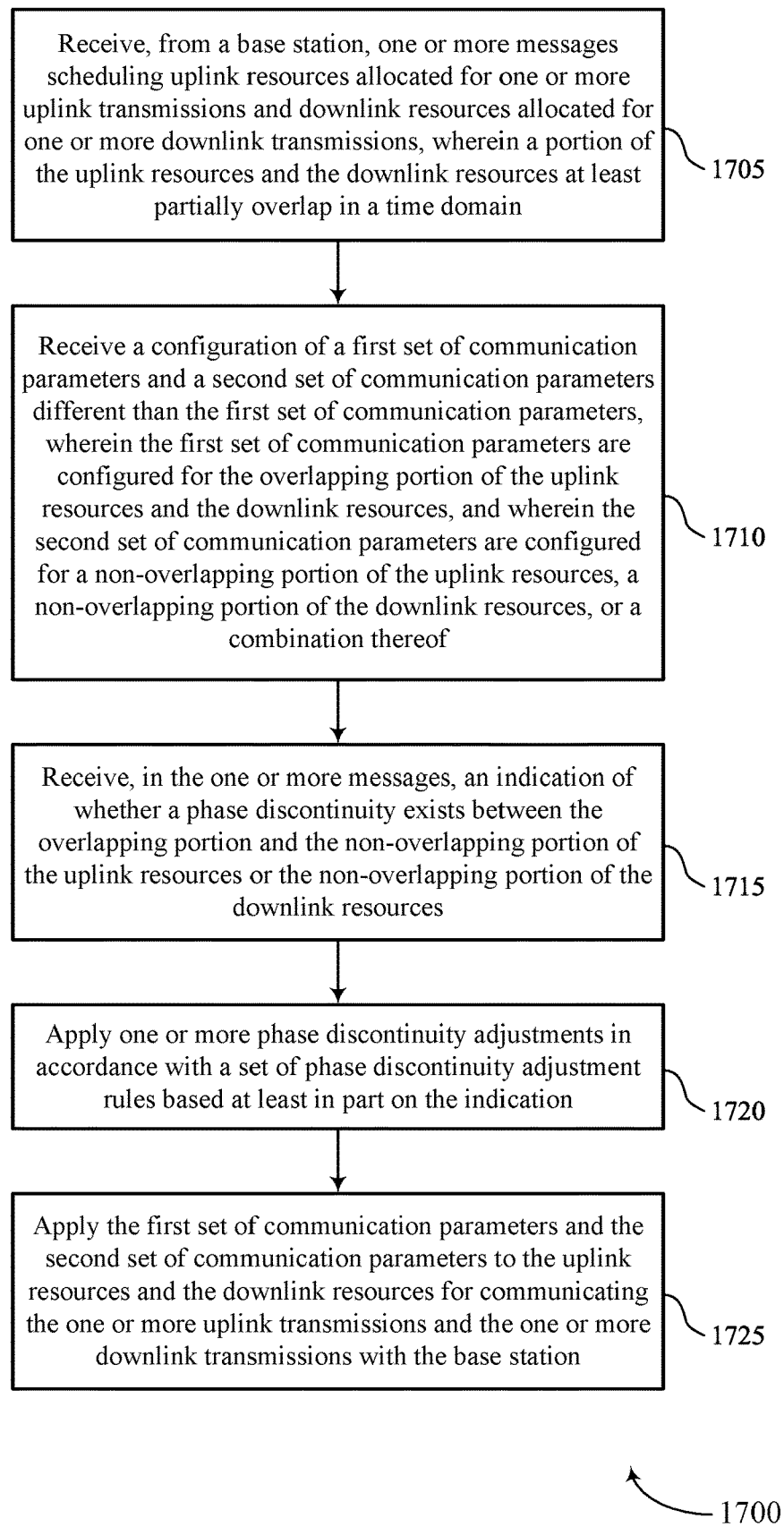

FIG. 17 shows a flowchart illustrating a method 1700 that supports scheduling parameters for unequal downlink and uplink transmissions in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The operations of 1705 may be performed in accordance with examples as disclosed herein. In some examples, aspects of the operations of 1705 may be performed by a resource scheduling receive component 825 as described with reference to FIG. 8.

At 1710, the method may include receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 1710 may be performed in accordance with examples as disclosed herein. In some examples, aspects of the operations of 1710 may be performed by a communication parameters receive component 830 as described with reference to FIG. 8.

At 1715, the method may include receiving, in the one or more messages, an indication of whether a phase discontinuity exists between the overlapping portion and the non-overlapping portion of the uplink resources or the non-overlapping portion of the downlink resources. The operations of 1715 may be performed in accordance with examples as disclosed herein. In some examples, aspects of the operations of 1715 may be performed by a phase discontinuity identification component 845 as described with reference to FIG. 8.

At 1720, the method may include applying one or more phase discontinuity adjustments in accordance with a set of phase discontinuity adjustment rules based on the indication. The operations of 1720 may be performed in accordance with examples as disclosed herein. In some examples, aspects of the operations of 1720 may be performed by a phase discontinuity identification component 845 as described with reference to FIG. 8.

At 1725, the method may include applying the first set of communication parameters and the second set of communication parameters to the uplink resources and the downlink resources for communicating the one or more uplink transmissions and the one or more downlink transmissions with the base station. The operations of 1725 may be performed in accordance with examples as disclosed herein. In some examples, aspects of the operations of 1725 may be performed by a communication parameters application component 835 as described with reference to FIG. 8.

Figure 18:
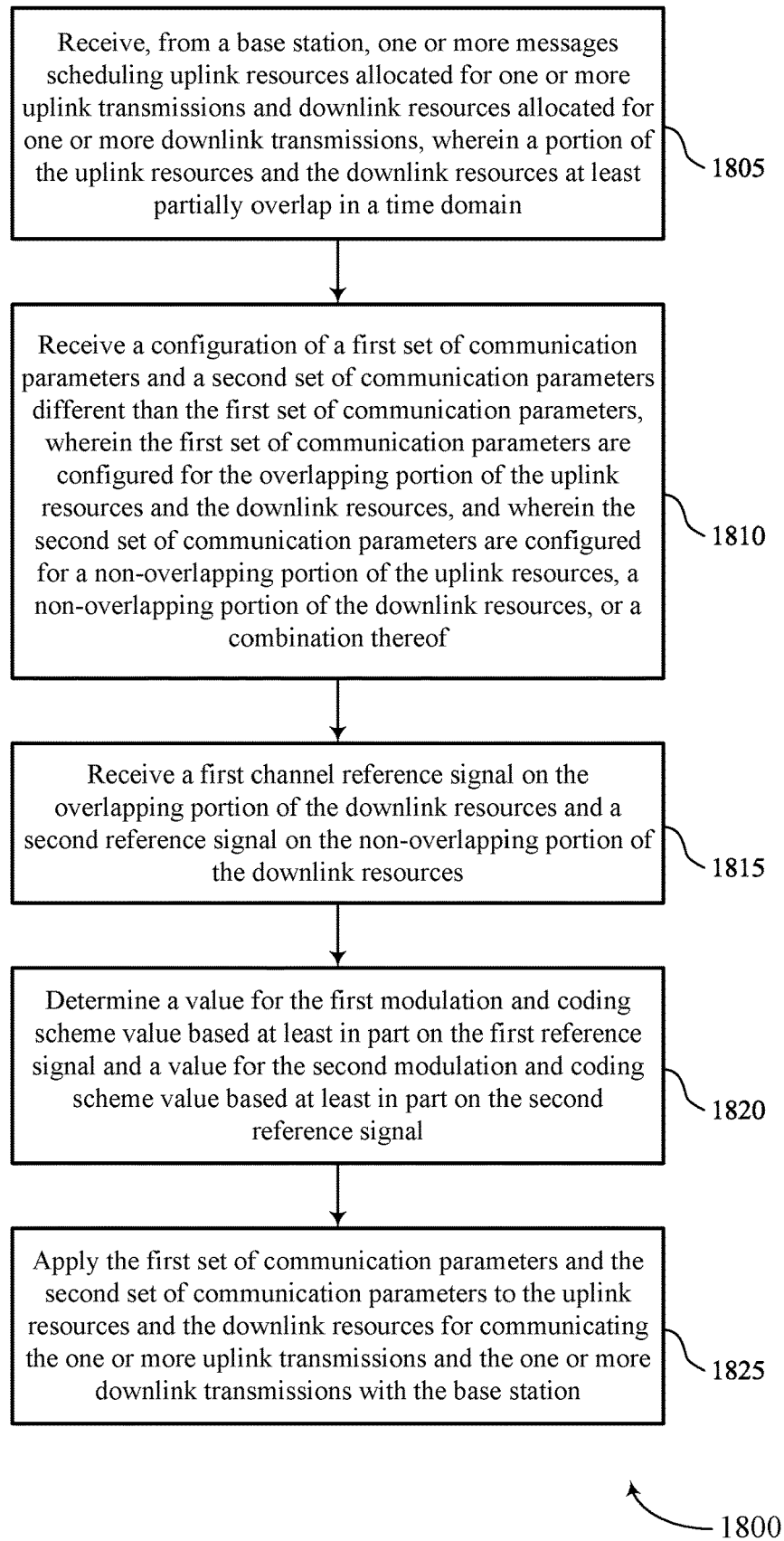

FIG. 18 shows a flowchart illustrating a method 1800 that supports scheduling parameters for unequal downlink and uplink transmissions in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The operations of 1805 may be performed in accordance with examples as disclosed herein. In some examples, aspects of the operations of 1805 may be performed by a resource scheduling receive component 825 as described with reference to FIG. 8.

At 1810, the method may include receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 1810 may be performed in accordance with examples as disclosed herein. In some examples, aspects of the operations of 1810 may be performed by a communication parameters receive component 830 as described with reference to FIG. 8.

At 1815, the method may include receiving a first reference signal on the overlapping portion of the downlink resources and a second reference signal on the non-overlapping portion of the downlink resources. The operations of 1815 may be performed in accordance with examples as disclosed herein. In some examples, aspects of the operations of 1815 may be performed by an CRS receive component 850 as described with reference to FIG. 8.

At 1820, the method may include determining a value for the first modulation and coding scheme value based on the first reference signal and a value for the second modulation and coding scheme value based on the second reference signal. The operations of 1820 may be performed in accordance with examples as disclosed herein. In some examples, aspects of the operations of 1820 may be performed by an MCS component 855 as described with reference to FIG. 8.

At 1825, the method may include applying the first set of communication parameters and the second set of communication parameters to the uplink resources and the downlink resources for communicating the one or more uplink transmissions and the one or more downlink transmissions with the base station. The operations of 1825 may be performed in accordance with examples as disclosed herein. In some examples, aspects of the operations of 1825 may be performed by a communication parameters application component 835 as described with reference to FIG. 8.

Figure 19:
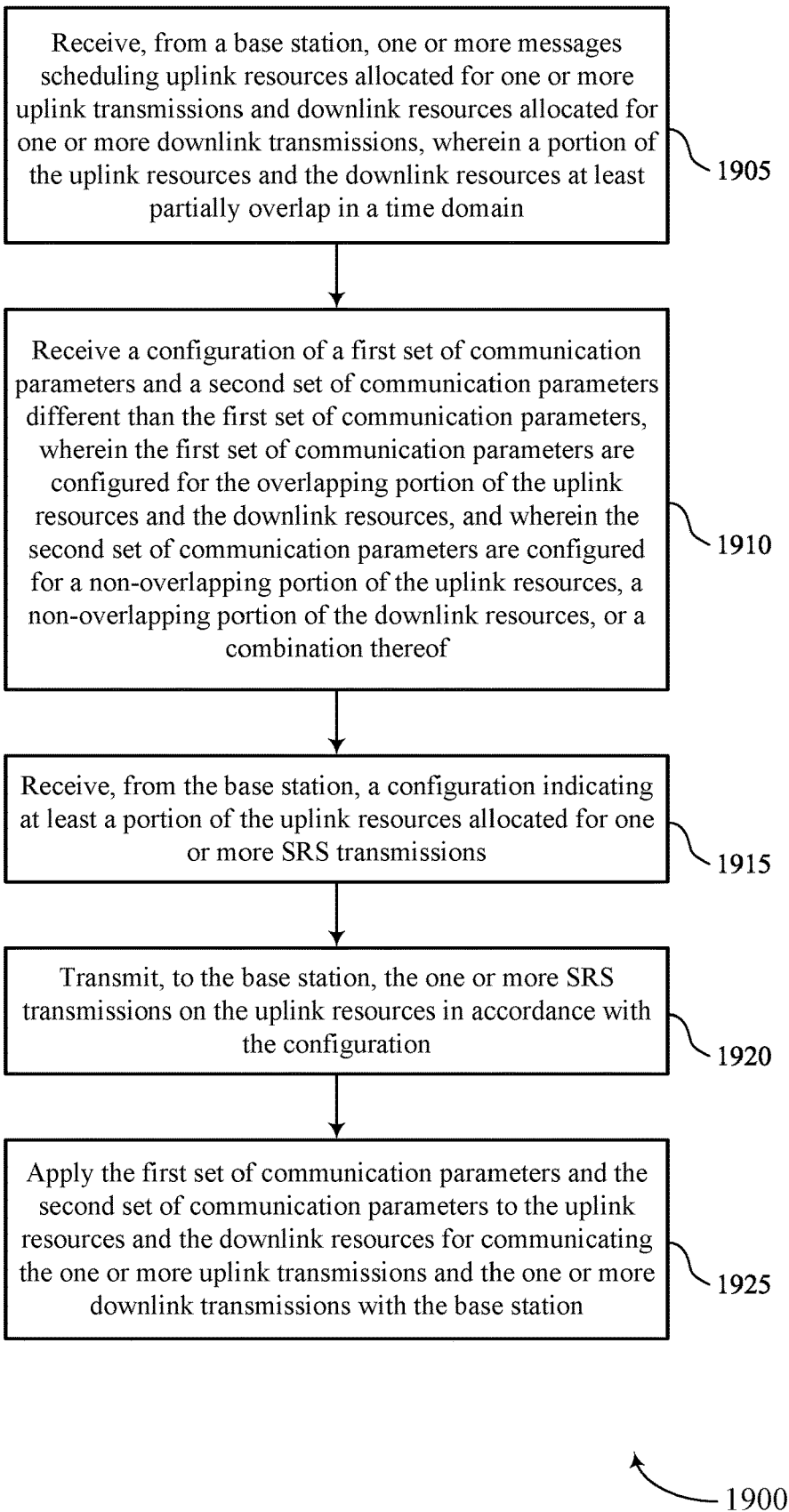

FIG. 19 shows a flowchart illustrating a method 1900 that supports scheduling parameters for unequal downlink and uplink transmissions in accordance with aspects of the present disclosure. The operations of the method 1900 may be implemented by a UE or its components as described herein. For example, the operations of the method 1900 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, one or more messages scheduling uplink resources allocated for one or more uplink transmissions and downlink resources allocated for one or more downlink transmissions, where a portion of the uplink resources and the downlink resources at least partially overlap in a time domain. The operations of 1905 may be performed in accordance with examples as disclosed herein. In some examples, aspects of the operations of 1905 may be performed by a resource scheduling receive component 825 as described with reference to FIG. 8.

At 1910, the method may include receiving a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 1910 may be performed in accordance with examples as disclosed herein. In some examples, aspects of the operations of 1910 may be performed by a communication parameters receive component 830 as described with reference to FIG. 8.

At 1915, the method may include receiving, from the base station, a configuration indicating at least a portion of the uplink resources allocated for one or more SRS transmissions. The operations of 1915 may be performed in accordance with examples as disclosed herein. In some examples, aspects of the operations of 1915 may be performed by an SRS component 860 as described with reference to FIG. 8.

At 1920, the method may include transmitting, to the base station, the one or more SRS transmissions on the uplink resources in accordance with the configuration. The operations of 1920 may be performed in accordance with examples as disclosed herein. In some examples, aspects of the operations of 1920 may be performed by an SRS component 860 as described with reference to FIG. 8.

At 1925, the method may include applying the first set of communication parameters and the second set of communication parameters to the uplink resources and the downlink resources for communicating the one or more uplink transmissions and the one or more downlink transmissions with the base station. The operations of 1925 may be performed in accordance with examples as disclosed herein. In some examples, aspects of the operations of 1925 may be performed by a communication parameters application component 835 as described with reference to FIG. 8.

Figure 20:
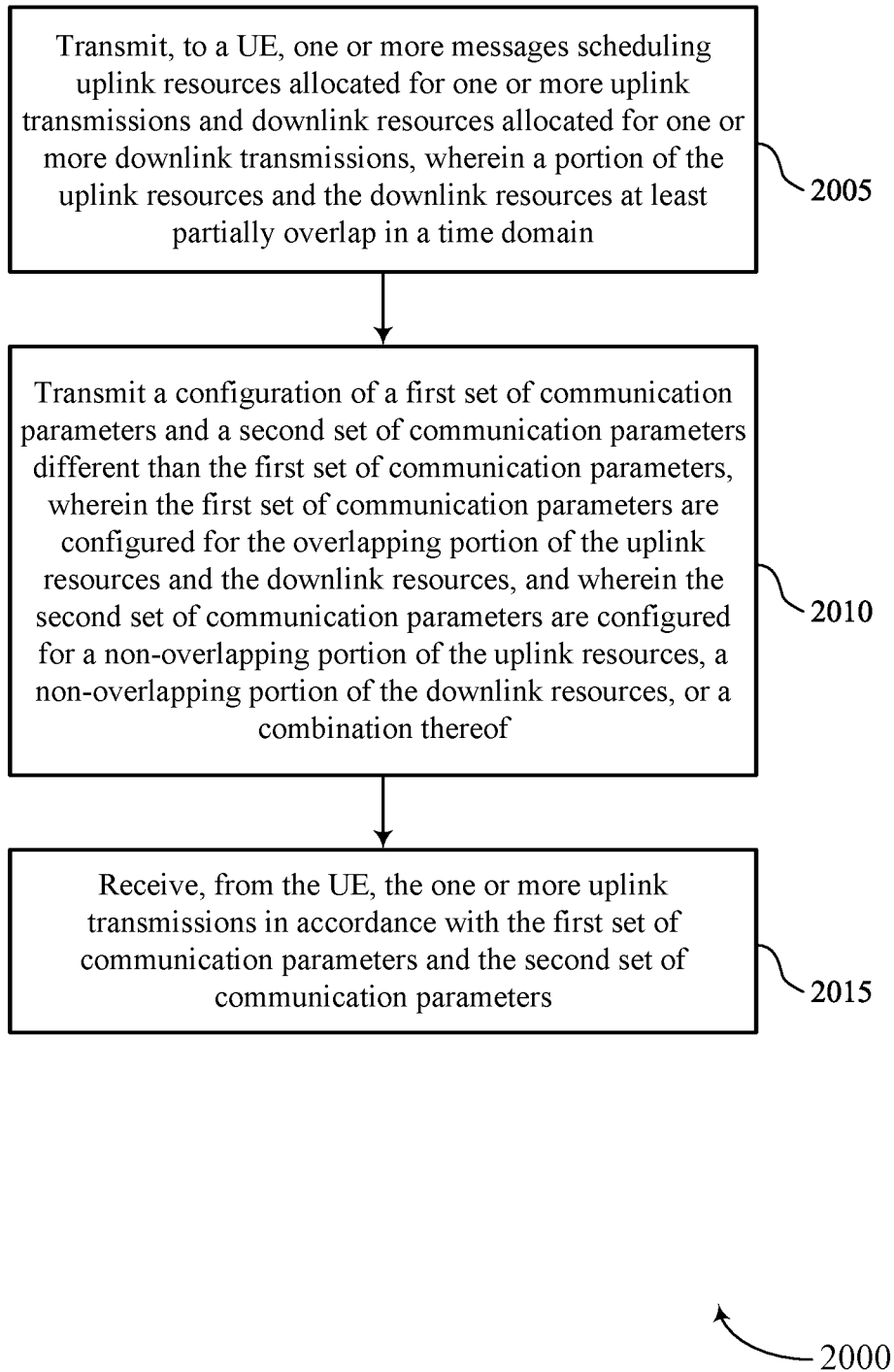

FIG. 20 shows a flowchart illustrating a method 2000 that supports scheduling parameters for unequal downlink and uplink transmissions in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, one or more messages scheduling uplink resources allocated for one or more uplink transmissions and downlink resources allocated for one or more downlink transmissions, where a portion of the uplink resources and the downlink resources at least partially overlap in a time domain. The operations of 2005 may be performed in accordance with examples as disclosed herein. In some examples, aspects of the operations of 2005 may be performed by a resource scheduling component 1225 as described with reference to FIG. 12.

At 2010, the method may include transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 2010 may be performed in accordance with examples as disclosed herein. In some examples, aspects of the operations of 2010 may be performed by a communication parameter transmission component 1230 as described with reference to FIG. 12.

At 2015, the method may include receiving, from the UE, the one or more uplink transmissions in accordance with the first set of communication parameters and the second set of communication parameters. The operations of 2015 may be performed in accordance with examples as disclosed herein. In some examples, aspects of the operations of 2015 may be performed by an uplink transmission receive component 1235 as described with reference to FIG. 12.

Figure 21:
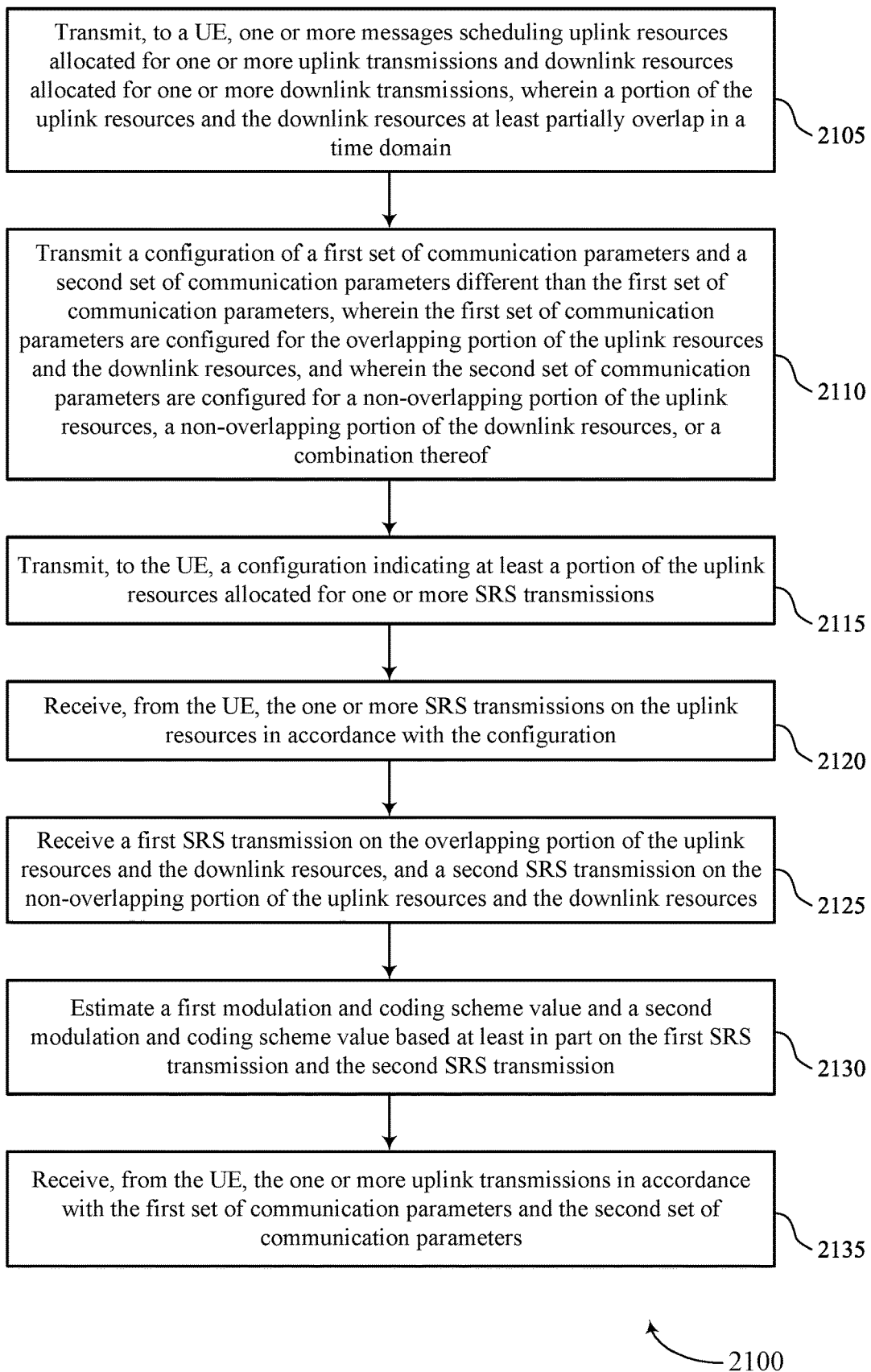

FIG. 21 shows a flowchart illustrating a method 2100 that supports scheduling parameters for unequal downlink and uplink transmissions in accordance with aspects of the present disclosure. The operations of the method 2100 may be implemented by a base station or its components as described herein. For example, the operations of the method 2100 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, one or more messages scheduling uplink resources allocated for one or more uplink transmissions and downlink resources allocated for one or more downlink transmissions, where a portion of the uplink resources and the downlink resources at least partially overlap in a time domain. The operations of 2105 may be performed in accordance with examples as disclosed herein. In some examples, aspects of the operations of 2105 may be performed by a resource scheduling component 1225 as described with reference to FIG. 12.

At 2110, the method may include transmitting a configuration of a first set of communication parameters and a second set of communication parameters different than the first set of communication parameters, where the first set of communication parameters are configured for the overlapping portion of the uplink resources and the downlink resources, and where the second set of communication parameters are configured for a non-overlapping portion of the uplink resources, a non-overlapping portion of the downlink resources, or a combination thereof. The operations of 2110 may be performed in accordance with examples as disclosed herein. In some examples, aspects of the operations of 2110 may be performed by a communication parameter transmission component 1230 as described with reference to FIG. 12.

At 2115, the method may include transmitting, to the UE, a configuration indicating at least a portion of the uplink resources allocated for one or more SRS transmissions. The operations of 2115 may be performed in accordance with examples as disclosed herein. In some examples, aspects of the operations of 2115 may be performed by a resource scheduling component 1225 as described with reference to FIG. 12.

At 2120, the method may include receiving, from the UE, the one or more SRS transmissions on the uplink resources in accordance with the configuration. The operations of 2120 may be performed in accordance with examples as disclosed herein. In some examples, aspects of the operations of 2120 may be performed by an uplink transmission receive component 1235 as described with reference to FIG. 12.

At 2125, the method may include receiving a first SRS transmission on the overlapping portion of the uplink resources and the downlink resources, and a second SRS transmission on the non-overlapping portion of the uplink resources and the downlink resources. The operations of 2125 may be performed in accordance with examples as disclosed herein. In some examples, aspects of the operations of 2125 may be performed by an uplink transmission receive component 1235 as described with reference to FIG. 12.

At 2130, the method may include estimating a first modulation and coding scheme value and a second modulation and coding scheme value based on the first SRS transmission and the second SRS transmission. The operations of 2130 may be performed in accordance with examples as disclosed herein. In some examples, aspects of the operations of 2130 may be performed by an MCS manager 1260 as described with reference to FIG. 12.

At 2135, the method may include receiving, from the UE, the one or more uplink transmissions in accordance with the first set of communication parameters and the second set of communication parameters. The operations of 2135 may be performed in accordance with examples as disclosed herein. In some examples, aspects of the operations of 2135 may be performed by an uplink transmission receive component 1235 as described with reference to FIG. 12.

The following provides an overview of aspects of the present disclosure:

Aspect 1: A method for wireless communications at a UE, comprising: receiving, from a base station, one or more messages scheduling uplink resources allocated for one or more uplink transmissions and downlink resources allocated for one or more downlink transmissions, wherein a portion of the uplink resources and the downlink resources at least partially overlap in a time domain; receiving a configuration of a first set of communication parameters and a second set of communication parameters different than the first set of communication parameters, wherein the first set of communication parameters are configured for the overlapping portion of the uplink resources and the downlink resources, and wherein the second set of communication parameters are configured for a non-overlapping portion of the uplink resources, a non-overlapping portion of the downlink resources, or a combination thereof; and applying the first set of communication parameters and the second set of communication parameters to the uplink resources and the downlink resources for communicating the one or more uplink transmissions and the one or more downlink transmissions with the base station.

Aspect 2: The method of aspect 1, wherein the first set of communication parameters comprises a first transmission power and the second set of communication parameters comprises a second transmission power different than the first transmission power, the method further comprising: receiving, in one or more fields of the one or more messages scheduling uplink and downlink resources, an indication of the first transmission power and the second transmission power; and adjusting an automatic gain control for the first transmission power and the second transmission power based at least in part on the one or more fields.

Aspect 3: The method of aspect 2, wherein the one or more fields of the one or more messages scheduling the uplink resources and the downlink resources indicate a power offset between the overlapping portion of the uplink resources and the downlink resources.

Aspect 4: The method of any of aspects 1 through 3, wherein the first set of communication parameters correspond to a first transmission power and the second set of communication parameters correspond to a second transmission power different than the first transmission power, the method further comprising: identifying, based at least in part on the one or more messages, a time period comprising a gap between the overlapping portion and the non-overlapping portion of the uplink resources or the non-overlapping portion of the downlink resources; and adjusting an automatic gain control during the time period based at least in part on the first transmission power and the second transmission power.

Aspect 5: The method of any of aspects 1 through 4, further comprising: receiving, in the one or more messages, an indication of whether a phase discontinuity exists between the overlapping portion and the non-overlapping portion of the uplink resources or the non-overlapping portion of the downlink resources; and applying one or more phase discontinuity adjustments in accordance with a set of phase discontinuity adjustment rules based at least in part on the indication.

Aspect 6: The method of aspect 5, further comprising: receiving, in the one or more messages, an indication of the phase discontinuity between the overlapping portion and the non-overlapping portion of the uplink resources or the non-overlapping portion of the downlink resources; and identifying a single-use DMRS for channel estimation and power adjustment based at least in part on the set of phase discontinuity adjustment rules and the indication of the phase discontinuity.

Aspect 7: The method of any of aspects 5 through 6, further comprising: receiving, in the one or more messages, an indication of a phase continuity between the overlapping portion and the non-overlapping portion of the uplink resources or the non-overlapping portion of the downlink resources; and identifying a DMRS to re-use for channel estimation and power adjustment based at least in part on the set of phase discontinuity adjustment rules and the indication of the phase continuity.

Aspect 8: The method of any of aspects 1 through 7, further comprising: receiving, in one or more fields of the one or more messages scheduling the uplink resources and the downlink resources, a power offset indicating a phase discontinuity between the overlapping portion and the non-overlapping portion of the uplink resources or the non-overlapping portion of the downlink resources; and applying one or more phase discontinuity adjustment rules based at least in part on the power offset.

Aspect 9: The method of aspect 8, wherein the power offset comprises a power offset threshold, the method further comprising: comparing a measured power offset between the overlapping portion and the non-overlapping portion of the uplink resources or the non-overlapping portion of the downlink resources to the power offset threshold; and applying one or more phase discontinuity adjustment rules based at least in part on the comparison.

Aspect 10: The method of any of aspects 1 through 9, wherein the first set of communication parameters comprises a first modulation and coding scheme value and the second set of communication parameters comprises a second modulation and coding scheme value different than the first modulation and coding scheme value, the method further comprising: receiving a first reference signal on the overlapping portion of the downlink resources and a second reference signal on the non-overlapping portion of the downlink resources; and determining a value for the first modulation and coding scheme value based at least in part on the first reference signal and a value for the second modulation and coding scheme value based at least in part on the second reference signal.

Aspect 11: The method of aspect 10, wherein the first reference signal and the second reference signal comprise a CSI-RS, a DMRS, or a combination thereof.

Aspect 12: The method of any of aspects 1 through 11, further comprising: receiving, from the base station, a configuration indicating at least a portion of the uplink resources allocated for one or more SRS transmissions; and transmitting, to the base station, the one or more SRS transmissions on the uplink resources in accordance with the configuration.

Aspect 13: The method of aspect 12, wherein the uplink resources comprise the overlapping portion of the uplink resources and the non-overlapping portion of the uplink resources.

Aspect 14: The method of any of aspects 12 through 13, wherein the uplink resources comprise the overlapping portion of the uplink resources or the non-overlapping portion of the uplink resources, the method further comprising: transmitting, to the base station, an indication of one or more transmission parameters for the other of the overlapping portion of the uplink resources or the non-overlapping portion of the uplink resources based at least in part on the one or more SRS transmissions on the uplink resources, wherein the one or more transmission parameters for the other of the overlapping portion of the uplink resources or the non-overlapping portion of the uplink resources comprise a transmission power backoff offset value.

Aspect 15: The method of any of aspects 1 through 14, further comprising: identifying a phase discontinuity between the overlapping portion and the non-overlapping portion of the uplink resources or the non-overlapping portion of the downlink resources; transmitting an indication of the phase discontinuity to the base station.

Aspect 16: The method of aspect 15, wherein transmitting the indication of the phase discontinuity comprises: transmitting the indication of the phase discontinuity in a capability message, an uplink control message, or a combination thereof.

Aspect 17: The method of any of aspects 1 through 16, wherein the first set of communication parameters correspond to first modulation and coding scheme values, first transmission power values, first TPMI values, first rank indication values, or any combination thereof, and the second set of communication parameters correspond to second modulation and coding scheme values, second transmission power values, second TPMI values, second rank indication values, or any combination thereof.

Aspect 18: The method of any of aspects 1 through 17, further comprising: identifying the portion of the uplink resources and the downlink resources that overlap based at least in part on a difference in a duration of the one or more uplink transmissions and a respective duration of the one or more downlink transmissions.

Aspect 19: The method of aspect 18, wherein an uplink transmission of the one or more uplink transmissions has a longer duration relative to a duration of a downlink transmission of the one or more downlink transmissions.

Aspect 20: The method of any of aspects 18 through 19, wherein an uplink transmission of the one or more uplink transmissions has a shorter duration relative to a duration of a downlink transmission of the one or more downlink transmissions.

Aspect 21: The method of any of aspects 1 through 20, wherein the one or more uplink transmissions and the one or more downlink transmissions comprise full-duplex transmissions, half duplex transmissions, or a combination thereof.

Aspect 22: A method for wireless communications at a base station, comprising: transmitting, to a UE, one or more messages scheduling uplink resources allocated for one or more uplink transmissions and downlink resources allocated for one or more downlink transmissions, wherein a portion of the uplink resources and the downlink resources at least partially overlap in a time domain; transmitting a configuration of a first set of communication parameters and a second set of communication parameters different than the first set of communication parameters, wherein the first set of communication parameters are configured for the overlapping portion of the uplink resources and the downlink resources, and wherein the second set of communication parameters are configured for a non-overlapping portion of the uplink resources, a non-overlapping portion of the downlink resources, or a combination thereof and receiving, from the UE, the one or more uplink transmissions in accordance with the first set of communication parameters and the second set of communication parameters.

Aspect 23: The method of aspect 22, wherein the first set of communication parameters comprises a first transmission power and the second set of communication parameters comprises a second transmission power different than the first transmission power, the method further comprising: transmitting, in one or more fields of the one or more messages scheduling uplink and downlink resources, an indication of the first transmission power and the second transmission power; and applying the first transmission power to the overlapping portion of the uplink resources and the second transmission power to the non-overlapping portion of the uplink resources, a non-overlapping portion of the downlink resources, or a combination thereof.

Aspect 24: The method of aspect 23, wherein the one or more fields of the one or more messages scheduling the uplink resources and the downlink resources indicate a power offset between the overlapping portion of the uplink resources and the downlink resources.

Aspect 25: The method of any of aspects 22 through 24, wherein the first set of communication parameters correspond to a first transmission power and the second set of communication parameters correspond to a second transmission power different than the first transmission power, the method further comprising: allocating a time gap between the overlapping portion and the non-overlapping portion of the uplink resources or the non-overlapping portion of the downlink resources for the UE to use to perform automatic gain control based at least in part on the first transmission power and the second transmission power.

Aspect 26: The method of any of aspects 22 through 25, further comprising: transmitting, in the one or more messages, an indication of whether a phase discontinuity exists between the overlapping portion and the non-overlapping portion of the uplink resources or the non-overlapping portion of the downlink resources; and receiving the one or more uplink transmissions in accordance with a set of phase discontinuity adjustment rules applied by the UE based at least in part on the indication.

Aspect 27: The method of aspect 26, further comprising: transmitting, in the one or more messages, an indication of the phase discontinuity between the overlapping portion and the non-overlapping portion of the uplink resources or the non-overlapping portion of the downlink resources; and transmitting a single-use DMRS for channel estimation and power adjustment based at least in part on the set of phase discontinuity adjustment rules and the indication of the phase discontinuity; or transmitting a DMRS to re-use for channel estimation and power adjustment based at least in part on the set of phase discontinuity adjustment rules and the indication of the phase discontinuity.

Aspect 28: The method of any of aspects 22 through 27, further comprising: transmitting, in one or more fields of the one or more messages scheduling the uplink resources and the downlink resources, an indication of one or more phase discontinuity adjustment rules associated with a power offset for a phase discontinuity between the overlapping portion and the non-overlapping portion of the uplink resources or the non-overlapping portion of the downlink resources.

Aspect 29: The method of aspect 28, wherein the power offset comprises a power offset threshold, the method further comprising: receiving the one or more uplink transmissions in accordance with the one or more phase discontinuity adjustment rules and the power offset threshold for the overlapping portion and the non-overlapping portion of the uplink resources or the non-overlapping portion of the downlink resources.

Aspect 30: The method of any of aspects 22 through 29, wherein the first set of communication parameters comprises a first modulation and coding scheme value and the second set of communication parameters comprises a second modulation and coding scheme value different than the first modulation and coding scheme value, the method further comprising: transmitting a first reference signal on the overlapping portion of the downlink resources and a second reference signal on the non-overlapping portion of the downlink resources.

Aspect 31: The method of aspect 30, wherein the first reference signal and the second reference signal comprise a CSI-RS, a DMRS, or a combination thereof.

Aspect 32: The method of any of aspects 22 through 31, further comprising: transmitting, to the UE, a configuration indicating at least a portion of the uplink resources allocated for one or more SRS transmissions; and receiving, from the UE, the one or more SRS transmissions on the uplink resources in accordance with the configuration.

Aspect 33: The method of aspect 32, wherein the uplink resources comprise the overlapping portion of the uplink resources and the non-overlapping portion of the uplink resources.

Aspect 34: The method of any of aspects 32 through 33, further comprising: receiving a first SRS transmission on the overlapping portion of the uplink resources and the downlink resources, and a second SRS transmission on the non-overlapping portion of the uplink resources and the downlink resources; and estimating a first modulation and coding scheme value and a second modulation and coding scheme value based at least in part on the first SRS transmission and the second SRS transmission.

Aspect 35: The method of any of aspects 22 through 34, further comprising: receiving, from the UE, an indication of a phase discontinuity between the overlapping portion and the non-overlapping portion of the uplink resources or the non-overlapping portion of the downlink resources.

Aspect 36: The method of aspect 35, further comprising: receiving the indication of the phase discontinuity in a capability message, an uplink control message, or a combination thereof.

Aspect 37: The method of any of aspects 22 through 36, wherein the first set of communication parameters correspond to first modulation and coding scheme values, first transmission power values, first TPMI values, first rank indication values, or any combination thereof, and the second set of communication parameters correspond to second modulation and coding scheme values, second transmission power values, second TPMI values, second rank indication values, or any combination thereof.

Aspect 38: The method of any of aspects 22 through 37, further comprising: identifying the portion of the uplink resources and the downlink resources that overlap based at least in part on a difference in a duration of the one or more uplink transmissions and a respective duration of the one or more downlink transmissions.

Aspect 39: The method of aspect 38, wherein an uplink transmission of the one or more uplink transmissions has a longer duration relative to a duration of a downlink transmission of the one or more downlink transmissions.

Aspect 40: The method of any of aspects 38 through 39, wherein an uplink transmission of the one or more uplink transmissions has a shorter duration relative to a duration of a downlink transmission of the one or more downlink transmissions.

Aspect 41: An apparatus for wireless communications at a UE, comprising a processor; memory coupled with the processor; and instructions stored in the memory and executable by the processor to cause the apparatus to perform a method of any of aspects 1 through 21.

Aspect 42: An apparatus for wireless communications at a UE, comprising at least one means for performing a method of any of aspects 1 through 21.

Aspect 43: A non-transitory computer-readable medium storing code for wireless communications at a UE, the code comprising instructions executable by a processor to perform a method of any of aspects 1 through 21.

Aspect 44: An apparatus for wireless communications at a base station, comprising a processor; memory coupled with the processor; and instructions stored in the memory and executable by the processor to cause the apparatus to perform a method of any of aspects 22 through 40.

Aspect 45: An apparatus for wireless communications at a base station, comprising at least one means for performing a method of any of aspects 22 through 40.

Aspect 46: A non-transitory computer-readable medium storing code for wireless communications at a base station, the code comprising instructions executable by a processor to perform a method of any of aspects 22 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or DMRS or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    receiving one or more messages scheduling uplink resources allocated for one or more uplink transmissions and downlink resources allocated for one or more downlink transmissions, wherein a portion of the uplink resources and the downlink resources at least partially overlap in a time domain;
    receiving a configuration of a first set of communication parameters and a second set of communication parameters different than the first set of communication parameters, wherein the first set of communication parameters are configured for an overlapping portion of the uplink resources and the downlink resources, and wherein the second set of communication parameters are configured for a non-overlapping portion of the uplink resources, a non-overlapping portion of the downlink resources, or a combination thereof; and
    applying the first set of communication parameters and the second set of communication parameters to the uplink resources and the downlink resources for communicating the one or more uplink transmissions and the one or more downlink transmissions.

2. The method of claim 1, wherein the first set of communication parameters comprises a first transmission power and the second set of communication parameters comprises a second transmission power different than the first transmission power, the method further comprising:
    receiving, in one or more fields of the one or more messages scheduling the uplink resources and the downlink resources, an indication of the first transmission power and the second transmission power; and
    adjusting an automatic gain control for the first transmission power and the second transmission power based at least in part on the one or more fields.

3. The method of claim 2, wherein the one or more fields of the one or more messages scheduling the uplink resources and the downlink resources indicate a power offset between the overlapping portion of the uplink resources and the downlink resources.

4. The method of claim 1, wherein the first set of communication parameters correspond to a first transmission power and the second set of communication parameters correspond to a second transmission power different than the first transmission power, the method further comprising:
    identifying, based at least in part on the one or more messages, a time period comprising a gap between the overlapping portion and the non-overlapping portion of the uplink resources or the non-overlapping portion of the downlink resources; and
    adjusting an automatic gain control during the time period based at least in part on the first transmission power and the second transmission power.

5. The method of claim 1, further comprising:
    receiving, in the one or more messages, an indication of whether a phase discontinuity exists between the overlapping portion and the non-overlapping portion of the uplink resources or the non-overlapping portion of the downlink resources; and
    applying one or more phase discontinuity adjustments in accordance with a set of phase discontinuity adjustment rules based at least in part on the indication.

6. The method of claim 5, further comprising:
    receiving, in the one or more messages, an indication of the phase discontinuity between the overlapping portion and the non-overlapping portion of the uplink resources or the non-overlapping portion of the downlink resources; and
    identifying a single-use demodulation reference signal for channel estimation and power adjustment based at least in part on the set of phase discontinuity adjustment rules and the indication of the phase discontinuity.

7. The method of claim 5, further comprising:
    receiving, in the one or more messages, an indication of a phase continuity between the overlapping portion and the non-overlapping portion of the uplink resources or the non-overlapping portion of the downlink resources; and
    identifying a demodulation reference signal to re-use for channel estimation and power adjustment based at least in part on the set of phase discontinuity adjustment rules and the indication of the phase continuity.

8. The method of claim 1, further comprising:
    receiving, in one or more fields of the one or more messages scheduling the uplink resources and the downlink resources, a power offset indicating a phase discontinuity between the overlapping portion and the non-overlapping portion of the uplink resources or the non-overlapping portion of the downlink resources; and
    applying one or more phase discontinuity adjustment rules based at least in part on the power offset.

9. The method of claim 8, wherein the power offset comprises a power offset threshold, the method further comprising:
    comparing a measured power offset between the overlapping portion and the non-overlapping portion of the uplink resources or the non-overlapping portion of the downlink resources to the power offset threshold; and
    applying the one or more phase discontinuity adjustment rules based at least in part on the comparing.

10. The method of claim 1, wherein the first set of communication parameters comprises a first modulation and coding scheme value and the second set of communication parameters comprises a second modulation and coding scheme value different than the first modulation and coding scheme value, the method further comprising:
    receiving a first reference signal on the overlapping portion of the downlink resources and a second reference signal on the non-overlapping portion of the downlink resources; and
    determining a value for the first modulation and coding scheme value based at least in part on the first reference signal and a value for the second modulation and coding scheme value based at least in part on the second reference signal.

11. The method of claim 10, wherein the first reference signal and the second reference signal comprise a channel state information reference signal, a demodulation reference signal, or a combination thereof.

12. The method of claim 1, further comprising:
receiving a second configuration indicating at least a portion of the uplink resources allocated for one or more sounding reference signal (SRS) transmissions; and
transmitting the one or more SRS transmissions on the uplink resources in accordance with the second configuration.

13. The method of claim 12, wherein the uplink resources comprise the overlapping portion of the uplink resources and the non-overlapping portion of the uplink resources.

14. The method of claim 12, wherein the uplink resources comprise the overlapping portion of the uplink resources or the non-overlapping portion of the uplink resources, the method further comprising:
transmitting an indication of one or more transmission parameters for the other of the overlapping portion of the uplink resources or the non-overlapping portion of the uplink resources based at least in part on the one or more SRS transmissions on the uplink resources, wherein the one or more transmission parameters for the other of the overlapping portion of the uplink resources or the non-overlapping portion of the uplink resources comprise a transmission power backoff offset value.

15. The method of claim 1, further comprising:
identifying a phase discontinuity between the overlapping portion and the non-overlapping portion of the uplink resources or the non-overlapping portion of the downlink resources; and
transmitting an indication of the phase discontinuity.

16. The method of claim 15, wherein transmitting the indication of the phase discontinuity comprises:
transmitting the indication of the phase discontinuity in a capability message, an uplink control message, or a combination thereof.

17. The method of claim 1, wherein the first set of communication parameters correspond to first modulation and coding scheme values, first transmission power values, first transmit precoding matrix index values, first rank indication values, or any combination thereof, and the second set of communication parameters correspond to second modulation and coding scheme values, second transmission power values, second transmit precoding matrix index values, second rank indication values, or any combination thereof.

18. The method of claim 1, further comprising:
identifying the portion of the uplink resources and the downlink resources that overlap based at least in part on a difference in a duration of the one or more uplink transmissions and a respective duration of the one or more downlink transmissions.

19. The method of claim 18, wherein an uplink transmission of the one or more uplink transmissions has a longer duration relative to a duration of a downlink transmission of the one or more downlink transmissions.

20. The method of claim 18, wherein an uplink transmission of the one or more uplink transmissions has a shorter duration relative to a duration of a downlink transmission of the one or more downlink transmissions.

21. The method of claim 1, wherein the one or more uplink transmissions and the one or more downlink transmissions comprise full-duplex transmissions, half-duplex transmissions, or a combination thereof.

22. A method for wireless communications at a network device, comprising:
transmitting, to a user equipment (UE), one or more messages scheduling uplink resources allocated for one or more uplink transmissions and downlink resources allocated for one or more downlink transmissions, wherein a portion of the uplink resources and the downlink resources at least partially overlap in a time domain;
transmitting a configuration of a first set of communication parameters and a second set of communication parameters different than the first set of communication parameters, wherein the first set of communication parameters are configured for an overlapping portion of the uplink resources and the downlink resources, and wherein the second set of communication parameters are configured for a non-overlapping portion of the uplink resources, a non-overlapping portion of the downlink resources, or a combination thereof; and
receiving, from the UE, the one or more uplink transmissions in accordance with the first set of communication parameters and the second set of communication parameters.

23. The method of claim 22, wherein the first set of communication parameters comprises a first transmission power and the second set of communication parameters comprises a second transmission power different than the first transmission power, the method further comprising:
transmitting, in one or more fields of the one or more messages scheduling the uplink resources and the downlink resources, an indication of the first transmission power and the second transmission power; and
applying the first transmission power to the overlapping portion of the uplink resources and the second transmission power to the non-overlapping portion of the uplink resources, the non-overlapping portion of the downlink resources, or a combination thereof.

24. The method of claim 23, wherein the one or more fields of the one or more messages scheduling the uplink resources and the downlink resources indicate a power offset between the overlapping portion of the uplink resources and the downlink resources.

25. The method of claim 22, wherein the first set of communication parameters correspond to a first transmission power and the second set of communication parameters correspond to a second transmission power different than the first transmission power, the method further comprising:
allocating a time gap between the overlapping portion and the non-overlapping portion of the uplink resources or the non-overlapping portion of the downlink resources for the UE to use to perform automatic gain control based at least in part on the first transmission power and the second transmission power.

26. The method of claim 22, further comprising:
transmitting, to the UE, a second configuration indicating at least a portion of the uplink resources allocated for one or more sounding reference signal (SRS) transmissions; and
receiving, from the UE, the one or more SRS transmissions on the uplink resources in accordance with the second configuration.

27. The method of claim 26, further comprising:
receiving a first sounding reference signal (SRS) transmission on the overlapping portion of the uplink resources and the downlink resources, and a second SRS transmission on the non-overlapping portion of the uplink resources and the downlink resources; and estimating a first modulation and coding scheme value and a second modulation and coding scheme value based at least in part on the first SRS transmission and the second SRS transmission.

28. The method of claim 22, further comprising:
receiving, from the UE, an indication of a phase discontinuity between the overlapping portion and the non-overlapping portion of the uplink resources or the non-overlapping portion of the downlink resources.

29. An apparatus for wireless communications at a user equipment (UE), comprising:
a processor;
memory coupled with the processor; and
instructions stored in the memory and executable by the processor to cause the apparatus to:
receive one or more messages scheduling uplink resources allocated for one or more uplink transmissions and downlink resources allocated for one or more downlink transmissions, wherein a portion of the uplink resources and the downlink resources at least partially overlap in a time domain;
receive a configuration of a first set of communication parameters and a second set of communication parameters different than the first set of communication parameters, wherein the first set of communication parameters are configured for an overlapping portion of the uplink resources and the downlink resources, and wherein the second set of communication parameters are configured for a non-overlapping portion of the uplink resources, a non-overlapping portion of the downlink resources, or a combination thereof; and
apply the first set of communication parameters and the second set of communication parameters to the uplink resources and the downlink resources for communicating the one or more uplink transmissions and the one or more downlink transmissions.

30. An apparatus for wireless communications at a network device, comprising:
a processor;
memory coupled with the processor; and
instructions stored in the memory and executable by the processor to cause the apparatus to:
transmit, to a user equipment (UE), one or more messages scheduling uplink resources allocated for one or more uplink transmissions and downlink resources allocated for one or more downlink transmissions, wherein a portion of the uplink resources and the downlink resources at least partially overlap in a time domain;
transmit a configuration of a first set of communication parameters and a second set of communication parameters different than the first set of communication parameters, wherein the first set of communication parameters are configured for an overlapping portion of the uplink resources and the downlink resources, and wherein the second set of communication parameters are configured for a non-overlapping portion of the uplink resources, a non-overlapping portion of the downlink resources, or a combination thereof; and
receive, from the UE, the one or more uplink transmissions in accordance with the first set of communication parameters and the second set of communication parameters.

* * * * *